(12) United States Patent
Kukal et al.

(10) Patent No.: US 10,997,332 B1
(45) Date of Patent: May 4, 2021

(54) SYSTEM AND METHOD FOR COMPUTING ELECTRICAL OVER-STRESS OF DEVICES ASSOCIATED WITH AN ELECTRONIC DESIGN

(71) Applicant: Cadence Design Systems, Inc., San Jose, CA (US)

(72) Inventors: Taranjit Singh Kukal, Delhi (IN); Siddharth Mohan, Pune (IN); Vikrant Khanna, Noida (IN); Kunal Gupta, Jaipur (IN); Jasleen Kaur Ahuja, New Delhi (IN); Nikhil Gupta, New Delhi (IN)

(73) Assignee: Cadence Design Systems, Inc., San Jose, CA (US)

(*) Notice: Subject to any disclaimer, the term of this patent is extended or adjusted under 35 U.S.C. 154(b) by 0 days.

(21) Appl. No.: 16/583,803

(22) Filed: Sep. 26, 2019

(51) Int. Cl.
| | |
|---|---|
| G06F 30/30 | (2020.01) |
| G06F 30/31 | (2020.01) |
| G06F 30/367 | (2020.01) |
| G06F 30/33 | (2020.01) |
| G06F 30/3308 | (2020.01) |
| G06F 30/392 | (2020.01) |
| G06F 30/398 | (2020.01) |
| G06F 119/02 | (2020.01) |
| G06F 115/12 | (2020.01) |
| G06F 111/12 | (2020.01) |

(52) U.S. Cl.
CPC ............ *G06F 30/31* (2020.01); *G06F 30/30* (2020.01); *G06F 30/33* (2020.01); *G06F 30/3308* (2020.01); *G06F 30/367* (2020.01); *G06F 30/392* (2020.01); *G06F 30/398* (2020.01); *G06F 2111/12* (2020.01); *G06F 2115/12* (2020.01); *G06F 2119/02* (2020.01)

(58) Field of Classification Search
None
See application file for complete search history.

(56) References Cited

U.S. PATENT DOCUMENTS 10,223,485 B2 * 3/2019 Srinivasan .......... G06F 30/3323
10,353,789 B1 * 7/2019 Najibi ................. G06F 11/261

OTHER PUBLICATIONS

P. Yoon et al., "Electrical Simulation and Analysis of Large Complex Electrical Systems," 1995 IEEE, pp. 697- (Year: 1995).*
M. Baird et al., "VerifyESD: A Tool for Efficient Circuit Level ESD Simulations of Mixed-Signal ICs," 2000 Proc. EOS/ESD Symposium, 5 pages. (Year: 2000).*

(Continued)

*Primary Examiner* — Leigh M Garbowski
(74) *Attorney, Agent, or Firm* — Mark H. Whittenberger, Esq.; Holland & Knight LLP

(57) ABSTRACT

Embodiments include herein are directed towards a method for use in an electronic design environment is provided. Embodiments may include receiving, using at least one processor, an electronic design schematic and splitting, using the at least one processor, the electronic design schematic into a plurality of subcircuits. Embodiments may further include independently simulating each of the plurality of subcircuits to generate simulation results and analyzing the simulation results to determine over-stress associated with the plurality of subcircuits.

20 Claims, 32 Drawing Sheets

(56) References Cited

OTHER PUBLICATIONS

L. McGarry et al., "A Virtual Prototyping Process for Power Supplies Using An Electronic Design Verification Testing (eDVT) System ," The 4th Int'l Power Electronics and Motion Control Conference, 2004, pp. 1689-1694 (Year: 2004).*

R. Gaertner et al., "Partitioned HBM Test—A New Method To Perform HBM Tests On Complex Devices," 2005 Electrical Overstress/Electrostatic Discharge Symposium, pp. 1-6. (Year: 2005).*

L. McGarry et al., "Quality Assurance Verification using a Virtual Prototyping System," 2005 IEEE, pp. 1325-1331. (Year: 2005).*

M. Krasich et al., "How to Estimate and Use MTTF/MTBF—Would the Real MTBF Please Stand Up?," 2009 Annual Reliability and Maintainability Symposium, IEEE, 7 pages. (Year: 2009).*

Z. Lu et al., "Hierarchical Verification of Chip-Level ESD Design Rules," 2010 Proc. Electrical Overstress/Electrostatic Discharge Symposium, 6 pages. (Year: 2010).*

M. Muhammad et al., "An ESD Design Automation Framework and Tool Flow for Nano-scale CMOS Technologies," 2010 Proc. Electrical Overstress/Electrostatic Discharge Symposium, 6 pages. (Year: 2010).*

N. Monnereau et al., "Building-up of System Level ESD Modeling: Impact of a Decoupling Capacitance on ESD Propagation," 2010 Proc. Electrical Overstress/Electrostatic Discharge Symposium, 10 pages. (Year: 2010).*

E. Gevinti et al., "HBM ESD EDA Check Method Applied to Complete Smart Power IC's—Functional Initialization and Implementation," 2013 35th Electrcal Overstress/Electrostatic Discharge Symposium, 10 pages. (Year: 2013).*

R. Myoung et al., "System-level ESD Failure Diagnosis with Chip-Package-System Dynamic ESD Simulation," 2014 Proc. Electrical Overstress/Electrostatic Discharge Symposium, 10 pages. (Year: 2014).*

S. Srinavasan et al., "A New Approach Using Symbolic Analysis to Computer Path-Dependent Effective Properties Preserving Hierarchy," 2014 IEEE, pp. 404-408. (Year: 2014).*

E. Gevinti et al., "Schematic-Level and Layout-Level ESD EDA Check Methodology Applied to Smart Power IC's—Initialization and Implementation," 2015 37th EOS/ESD, 10 pages. (Year: 2015).*

T. Mitchell et al, "HV Latchup—Power Analog ICs Co-Design with Block Level Verification," 2017 39th Electrical Overstress/Electrostatic Discharge Symposium (EOS/ESD), 10 pages. (Year: 2017).*

P. Ngan et al., "Automatic Layout Based Verification of Electrostatic Discharge Paths," 2001, ESD Association, pp. 95-100. (Year: 2001).*

S.K. Rao et al., "Framework for Dynamic Estimation of Power-Supply Noise and Path Delay," 2013 IEEE Int'l Symposium on Defect Fault Tolerance in VLSI and Nanotechnology Systems (DFTS), pp. 272-277. (Year: 2013).*

* cited by examiner

SYSTEM AND METHOD FOR COMPUTING ELECTRICAL OVER-STRESS OF DEVICES ASSOCIATED WITH AN ELECTRONIC DESIGN

BACKGROUND

Design engineers may often desire to simulate an IC (integrated circuit) design within the context of a system design that spans across the IC design fabric, the package design fabric, and PCB (printed circuit board) design fabric. Today's PCBs are quite complicated running into many hundreds of pages and thousands of components with a mix of connectors, digital content and analog content and it is almost impossible to simulate such a circuit. Large PCB circuits cannot be simulated to estimate electrical over-stress. Electrical stress generally refers to the measure of the component's operating conditions with respect to maximum ratings. It is necessary to simulate the circuit to estimate voltages and currents in the devices, which then can be post-processed to calculate power-dissipation, voltage-breakdowns and current-stress in the devices used in PCB circuit.

SUMMARY

In one or more embodiments of the present disclosure, a computer-implemented method for use in an electronic design environment is provided. The method may include receiving, using at least one processor, an electronic design schematic and splitting, using the at least one processor, the electronic design schematic into a plurality of subcircuits. The method may further include independently simulating each of the plurality of subcircuits to generate simulation results and analyzing the simulation results to determine over-stress associated with the plurality of subcircuits.

One or more of the following features may be included. The electronic design schematic may be a printed circuit board ("PCB") schematic. Splitting may include using a bias net as a terminating interface. Splitting may include using a digital net as a terminating interface. Splitting may include using a connector as a terminating interface. Independently simulating may include using pin information to apply a stimulus. The method may include displaying at least a portion of an overstressed device at a graphical user interface.

In one or more embodiments of the present disclosure a computer-readable storage medium having stored thereon instructions, which when executed by a processor result in one or more operations is provided. Operations may include receiving, using at least one processor, an electronic design schematic and splitting, using the at least one processor, the electronic design schematic into a plurality of subcircuits. Operations may further include independently simulating each of the plurality of subcircuits to generate simulation results and analyzing the simulation results to determine over-stress associated with the plurality of subcircuits.

One or more of the following features may be included. The electronic design schematic may be a printed circuit board ("PCB") schematic. Splitting may include using a bias net as a terminating interface. Splitting may include using a digital net as a terminating interface. Splitting may include using a connector as a terminating interface. Independently simulating may include using pin information to apply a stimulus. Operations may include displaying at least a portion of an overstressed device at a graphical user interface.

In one or more embodiments of the present disclosure, a system for use in an electronic design environment is provided. The system may include at least one processor configured to receive an electronic design schematic. The at least one processor may be further configured to split the electronic design schematic into a plurality of subcircuits. The at least one processor may be further configured to independently simulate each of the plurality of subcircuits to generate simulation results. The at least one processor may be further configured to analyze the simulation results to determine over-stress associated with the plurality of subcircuits.

One or more of the following features may be included. The electronic design schematic may be a printed circuit board ("PCB") schematic. Splitting may include using a bias net as a terminating interface. Splitting may include using a digital net as a terminating interface. Splitting may include using a connector as a terminating interface. Independently simulating may include using pin information to apply a stimulus.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments are directed to a method, system, and computer program product for computing electrical over-stress in an electronic design. In some embodiments, the present disclosure may allow for the determination of electrical over-stress of devices on a PCB using transient simulations of automatically partitioned circuits. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s). Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-29.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1A:
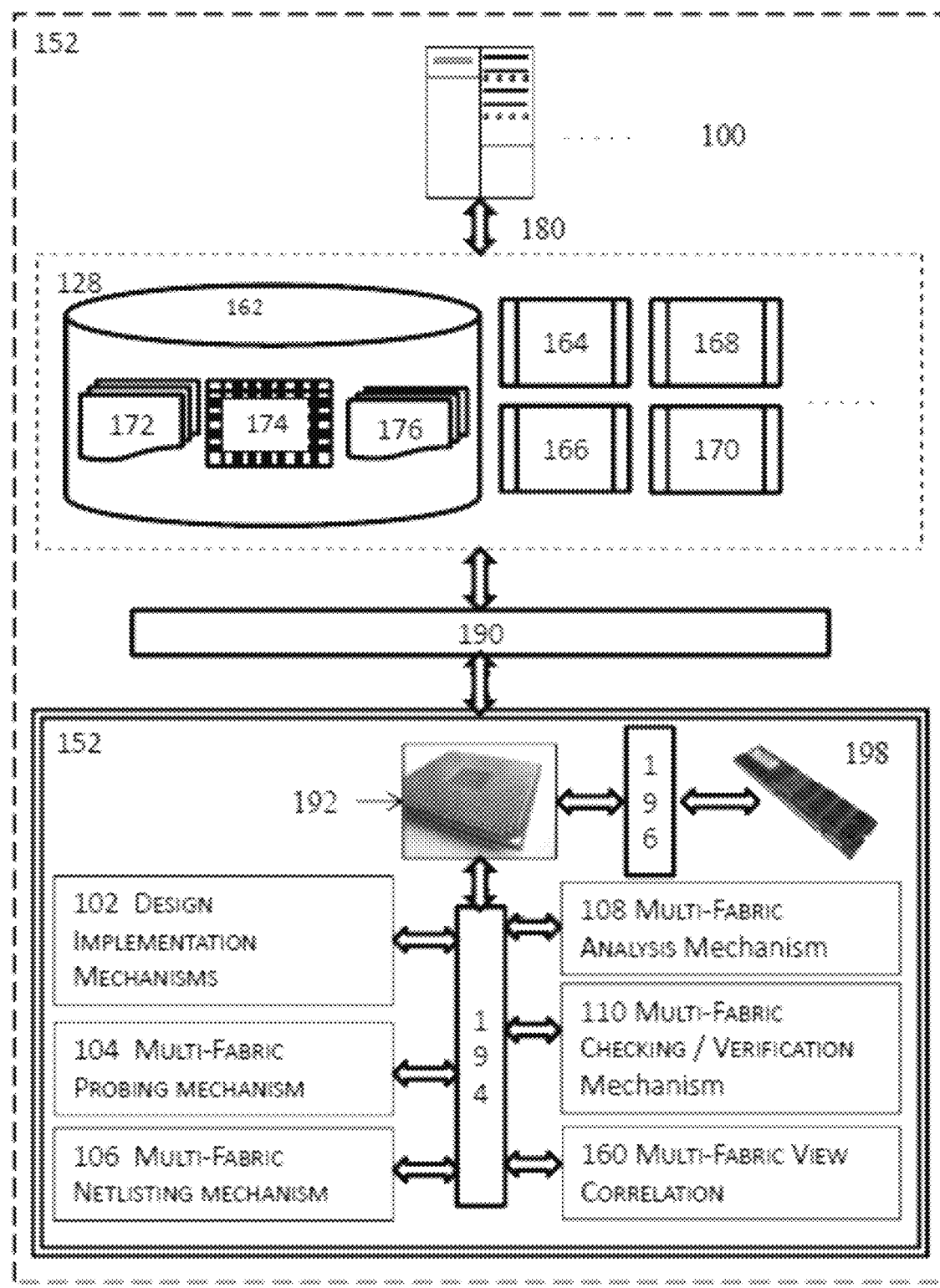
FIG. 1A illustrates a high level schematic block diagram for power-grid aware simulation of an IC-Package schematic in one or more embodiments.

FIG. 1A illustrates a high level schematic block diagrams for computing electrical over-stress of one or more devices in one or more embodiments. More specifically, FIG. 1A illustrates an illustrative high level schematic block diagrams for computing electrical over-stress and may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc.

The one or more computing systems 100 may further write to and read from a local or remote non-transitory computer accessible storage 162 that stores thereupon data or information such as, but not limited to, one or more databases (174) such as schematic design database(s) or physical design database(s), electronic circuit design specification database(s), various statistics, various data, rule decks, various design rules, constraints, etc. (172), or other information or data (176) that may be used to facilitate the performance of various functions to achieve the intended purposes.

In some embodiments, the one or more computing systems 100 may include or, either directly or indirectly through the various resources 128, invoke a set of mechanisms 152 including hardware mechanisms and software modules or combinations of one or more hardware mechanisms and one or more software modules that may comprises a plurality of design implementation modules 102 (e.g., schematic design tool, layout tool, etc.) to insert, remove, modify, improve, optimize, or otherwise operate upon designs in different fabrics (e.g., the die design fabric, the integrated circuit or IC packaging design fabric, the printed circuit board or PCB design fabric, the test bench design fabric, etc.), one or more multi-fabric probing modules 104 to probe multi-fabric designs across multiple design fabrics.

The set of mechanisms 152 may further optionally include one or more multi-fabric netlisting modules 106 to netlist multi-fabric designs across multiple design fabrics, one or more multi-fabric analysis modules 108 to simulate or analyze multi-fabric design across multiple design fabrics, one or more check or verification modules 110 to check or verify the correctness of multi-fabric designs across multiple design fabrics, and one or more multi-fabric view correlation modules 160 to correlate various symbolic views, schematic views, and/or layout views with the schematic design data or the layout data in different design fabrics at various hierarchical levels, etc.

In some embodiments, the computing system 100 may include the various resources 128 such that these various resources may be invoked from within the computing system via a computer bus 180 (e.g., a data bus interfacing a microprocessor 192 and the non-transitory computer accessible storage medium 198 or a system bus 190 between a microprocessor 192 and one or more engines in the various resources 128). In some other embodiments, some or all of these various resources may be located remotely from the computing system 100 such that the computing system may access the some or all of these resources via a computer bus 180 and one or more network components.

The computing system may also include one or more mechanisms in the set of mechanisms 152. One or more mechanisms in the set 152 may include or at least function in tandem with a microprocessor 192 via a computer bus 194 in some embodiments. In these embodiments, a single microprocessor 192 may be included in and thus shared among more than one mechanism even when the computing system 100 includes only one microprocessor 192. A microprocessor 192 may further access some non-transitory memory 198 (e.g., random access memory or RAM) via a system bus 196 to read and/or write data during the microprocessor's execution of processes.

Figure 1B:
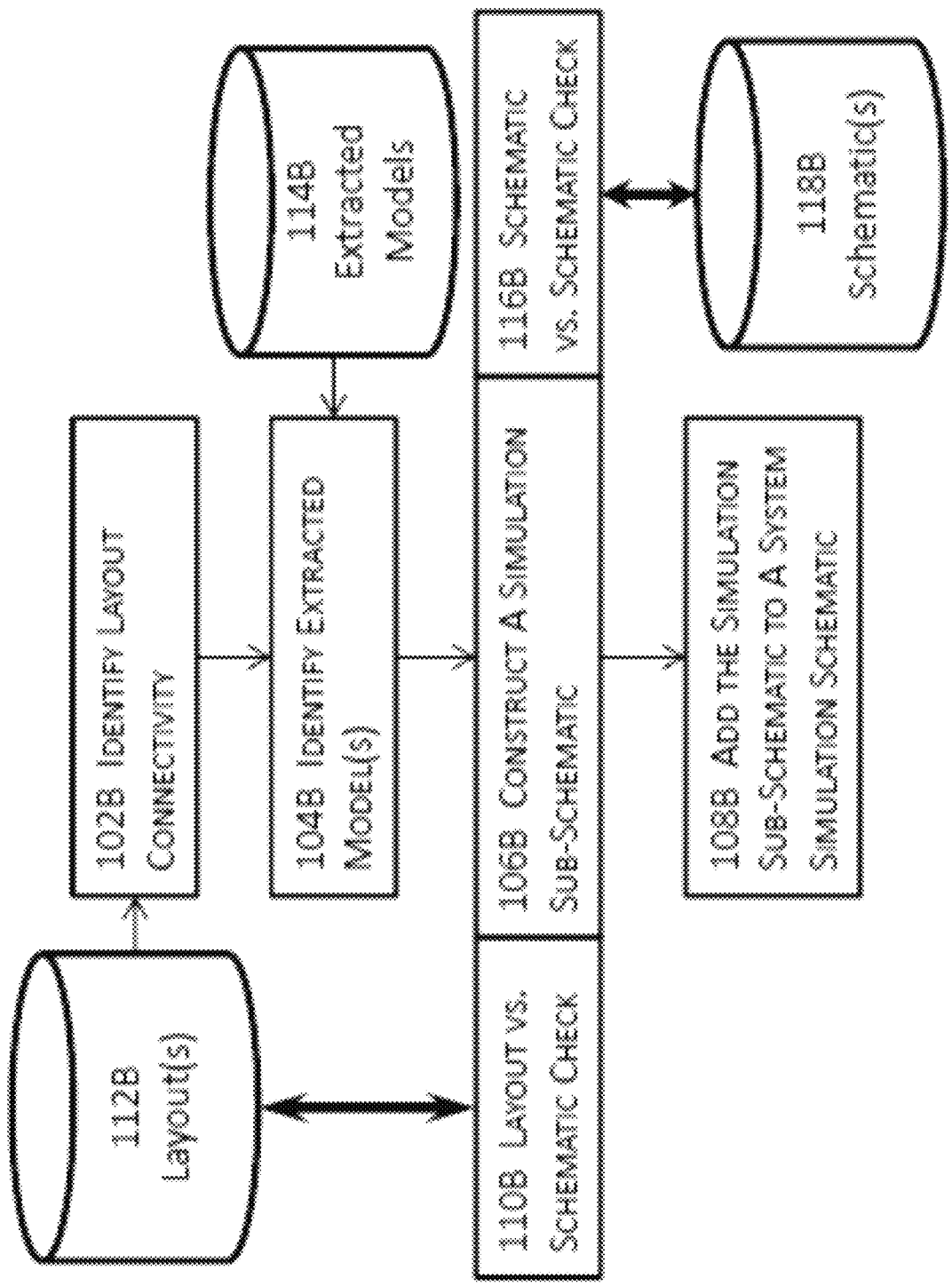
FIG. 1B illustrates another high level schematic block diagrams for power-grid aware simulation of an IC-Package schematic in one or more embodiments.

FIG. 1B illustrates another high level schematic block diagrams for computing electrical over-stress of one or more devices in one or more embodiments. In these embodiments, one or more layouts 112B may be identified from one or more non-transitory computer readable storage media or devices. These one or more layouts may include one or more integrated circuit (IC) layouts, one or more IC package layouts for the one or more IC layouts, and/or a printed circuit board (PCB) layout, etc.

Layout connectivity may be identified or extracted at 102B from these one or more layouts 112B, and the extracted layout connectivity may be used to interconnect various models in the simulation schematic. One or more extracted models may be identified at 104B from a list of extracted models 114B obtained from the same electronic design or one or more prior electronic designs.

It shall be noted that various schematics may or may not necessarily exist in these one or more embodiments illustrated in FIG. 1B. Existing schematic symbols or models may be leveraged such that extracted models need not be constructed every time they are needed in a simulation schematic. A schematic cellview symbol or model may be used directly as an extracted model in a simulation schematic in some embodiments or may be annotated, stitched, or associated with parasitic data to form an extracted model in some other embodiments.

In some embodiments where one or more schematic designs (e.g., the schematic of a PCB design, the schematic of an IC package, the schematic of an IC design, etc.) do exist, the schematic models or cellview symbols for circuit component designs in a plurality of design fabrics may thus be extracted from the respective schematic designs and imported as the extracted models into the simulation schematic. In some embodiments, a schematic cellview symbol or model may further be annotated or stitched with parasitic data and stored as an extracted model in a central repository.

These one or more schematic designs may or may not necessarily be in a format that is compatible or recognizable by the native editor of a simulation schematic. Schematic cellview symbols or models from these one or more schematic designs may be imported as extracted models into a simulation schematic via transformation in some embodiments or may be constructed anew and stored in a central repository in some other embodiments.

In some other embodiments where the schematic designs are unavailable or incomplete such that some circuit component designs extracted from one or more layouts (e.g., an IC layout, an IC package layout, a PCB layout, etc.) do not correspond to any existing schematic models or cellview symbols that may be used in simulation schematics, the extracted models for these layout circuit component designs may be constructed anew.

An extracted model includes a simplified model to represent one or more layout circuit component designs in a simulation schematic in some embodiments. In some of these embodiments, an extracted model is placeable in a simulation schematic and includes model connectivity information (e.g., net names, port names, pin names, etc.) that may be used to interconnect the extracted model to one or more other models or external circuitry in the simulation schematic. For example, extracted models may be interconnected by straight or rectilinear flight-lines in some embodiments.

An extracted model may be constructed anew for a layout circuit component (e.g., an instance of a cell or block) and include a flat or a hierarchical structure of multiple hierarchies or a plurality of circuit components. For example, it may be determined that a circuit component design extracted from a layout does not correspond to any existing extracted models.

In some embodiments, an extracted model may be constructed by using a corresponding schematic cellview symbol or model from the schematic design (if available) or from a schematic cellview symbol data structure. For example, various techniques may first examine a schematic symbol cellview data structure (e.g., a list, a table, a database, etc.) to determine whether a schematic cellview symbol exists for the circuit component design. If an existing schematic cellview symbol exists for the circuit component design based on, for example, the type, identification, function, and/or connectivity, etc. of the circuit component design, the schematic cellview symbol may be retrieved from the schematic cellview symbol data structure to represent the layout circuit component.

The schematic cellview symbol may be further associated with other data (e.g., the identifications of ports for interconnection, the identifications of the layer, the instance, the hierarchy, etc.) specific to this particular circuit component to represent this particular circuit component in simulation schematics. In some other embodiments where no schematic cellview symbols or models correspond to the circuit component design extracted from the layout, a new schematic cell view symbol may be constructed anew with a native schematic editor that is capable of natively editing the simulation schematics in one or more design fabrics.

In some of these embodiments, an extracted model may include a geometric entity (e.g., a rectangle) that has any shape or size and is placeable in a simulation schematic or in the schematic design corresponding to the layout from which the circuit design component is extracted. In some other embodiments, an extracted model may include a geometric entity (e.g., a rectangle) that exactly, approximately, or proportionally represents the actual geometries of the circuit component (or circuit components).

These existing and newly constructed extracted models may thus be used to construct a simulation schematic at 106B for the electronic design that spans across multiple design fabrics. One or more layout versus schematic checks may be performed at 110B on the layouts 112B and the simulation schematic determined at 108B to determine whether the simulation schematic determined at 108B correctly corresponds to the layouts of the electronic design in these multiple design fabrics. In some embodiments where at least some schematic designs 118B are available, one or more schematic versus schematic checks may also be performed at 116B on these at least some schematics and the simulation schematic to determine whether the constructed simulation schematic correctly corresponds to these at least some schematics 118B.

The simulation schematic may be incrementally constructed and added as a simulation sub-schematic to a system simulation schematic at 108B. For example, an IC layout may be identified; circuit design components may be extracted from the identified IC layout; extracted models may be identified or constructed anew for these IC layout circuit design components; the simulation sub-schematic for the IC layout may be constructed with these extracted models; and the simulation sub-schematic may be incrementally constructed into a system simulation schematic (e.g., a system simulation schematic for a PCB design including the IC design).

Figure 1C:
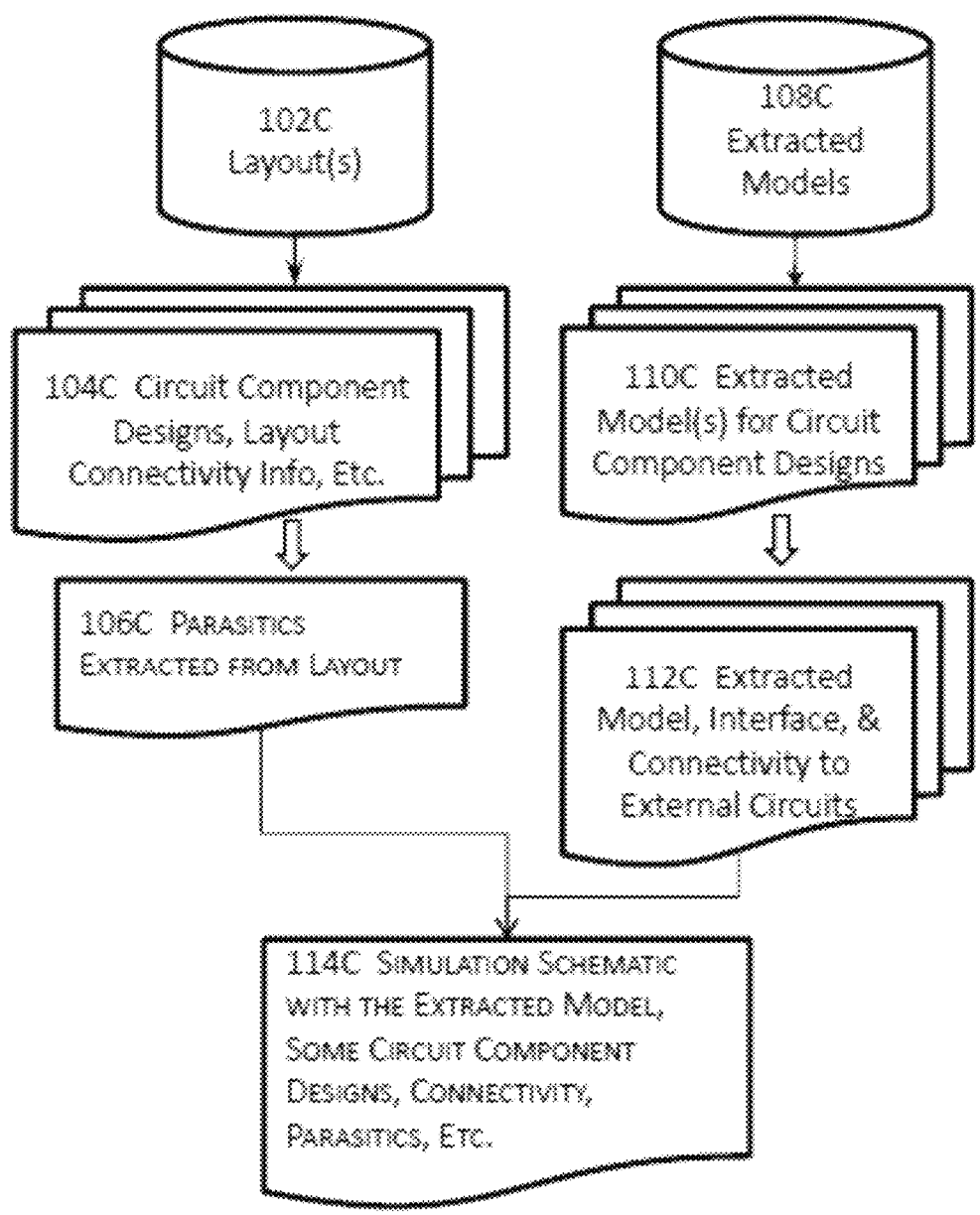
FIG. 1C illustrates another high level schematic block diagrams for power-grid aware simulation of an IC-Package schematic in one or more embodiments.

FIG. 1C illustrates another high level schematic block diagrams for determining electrical over-stress in one or more embodiments. In these embodiments, one or more layouts (e.g., one or more IC layouts, one or more IC package layouts corresponding to the one or more IC layouts, a PCB layout, etc.) may be identified from a non-transitory computer accessible store medium or device 102C; and existing extracted models corresponding to respective layout circuit components may be retrieved from an extracted model data structure 108C in the same or a different non-transitory computer accessible store medium or device. Circuit component designs and layout connectivity information for interconnecting among these circuit component designs and external circuitry 104C may be extracted from the one or more layouts 102C. Parasitic data 106C may also be extracted from these one or more layouts 102C.

If extracted models 108C exist for at least some circuit component designs in the one or more layout 102C, these extracted models 110C may be retrieved from the extracted model data structure 108C. These existing extracted models, their respective interface information (e.g., the names of the ports, the names of nets connected to the interface, etc.), and/or connectivity information to external circuitry of an extracted model 112C may be identified. In some embodiments, these extracted models themselves may already include or be associated with parasitics and connectivity information.

These existing extracted models for some layout circuit component designs together with newly constructed extracted models for other layout circuit component designs for which no extracted models exist may be placed into a simulation schematic 114C. For example, a layout may include circuit component designs L1, C1, R2, Q4, U1, U2, and L7, where existing extracted models are determined to be available for layout circuit component designs C1, R2, and L7. In this example, the simulation schematic for this layout may include the existing extracted models for C1, R2, and L7 as well as newly constructed extracted models for L1, Q4, U1, and U2.

Figure 1D:
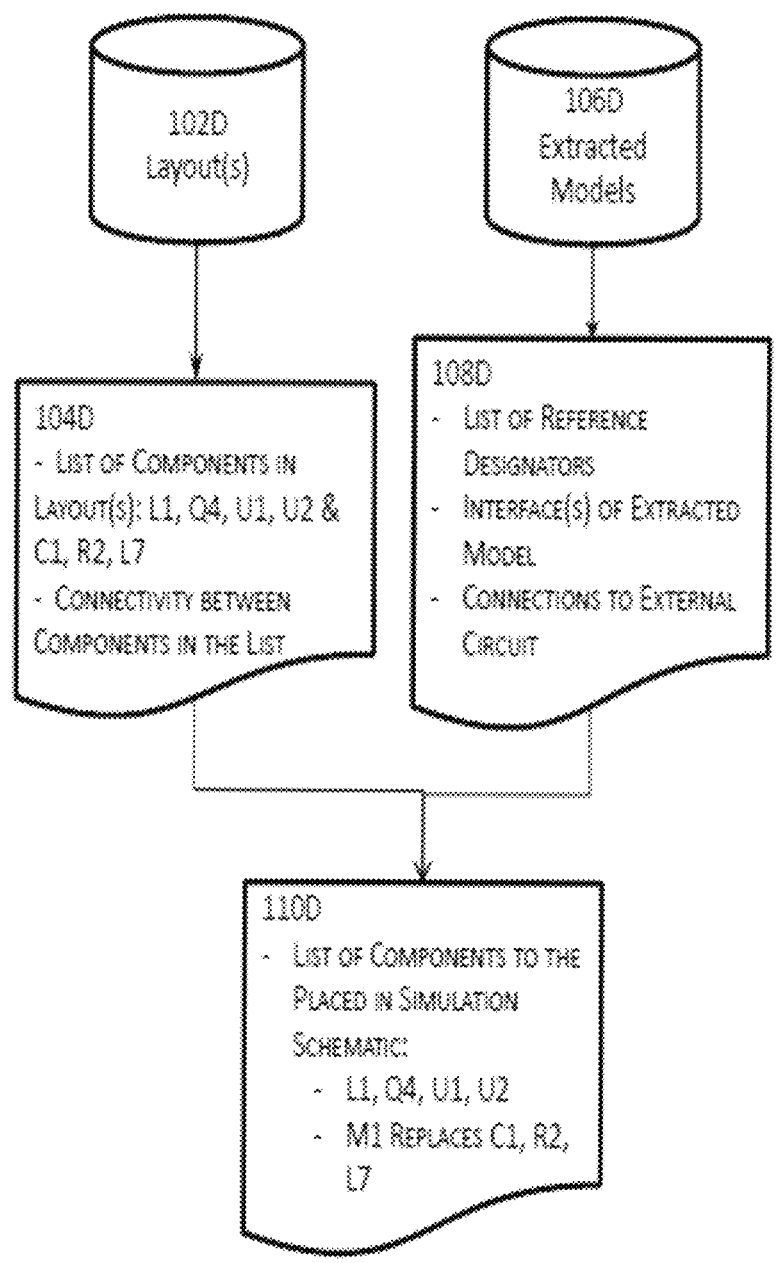
FIG. 1D illustrates an example of determining a list of circuit component designs to place in a simulation schematic in one or more embodiments.

This example is further illustrated in FIG. 1D which illustrates an example of determining a list of circuit component designs to place in a simulation schematic in one or more embodiments. From the layout 102D, a list of circuit component designs 104D in the layout (e.g., L1, Q4, U1, U2, C1, R2, and L7) may be obtained from the layout 102D. In addition, the connectivity between these circuit component designs in the list may also be determined and added to 104D. As described above, an extracted model M1 already exists for the circuit component designs C1, R2, and L7 and may be retrieved from a data structure or database 106D including extracted models. A list of reference designators and the interfaces for the extracted models (e.g., M1) may also be retrieved from the data structure or database 106D. The connectivity information of an extracted model (e.g., M1) may also be retrieved from the data structure or database 106D of extracted models. With the list of components and the connectivity from 104D and the list of reference designators and the interface and connectivity for the extracted model (M1), a list of components or models to be placed in the corresponding simulation schematic 110D may be determined. In this example, the simulation schematic 110D may include the circuit component designs or the schematic symbols or models thereof for L1, Q4, U1, and U2 that do not correspond to any extracted models. The simulation schematic may further include the extracted model M1 that is to replace the circuit component designs (or the schematic symbols or models thereof) for circuit component designs C1, R2, and L7. In some embodiments, an extract model (e.g., M1 in this example illustrated in FIG. 1D) may include, for example, an s-parameter (scattering-parameter) model.

In some embodiments where individual extracted models may not be available or exist, but an aggregated extracted model may nevertheless exist for a plurality of interconnected circuit component designs. In these embodiments, the aggregated extracted model may be identified and used to represent the plurality of interconnected circuit component designs in simulation schematics. In the aforementioned example where no extracted models exist for layout circuit components L1, Q4, U1, and U2, but an aggregated extracted model nevertheless exists and includes these layout circuit components L1, Q4, U1, and U2.

In this example, the aggregated extracted model together with the data of its interface to external circuits, rather than individual extracted models for L1, Q4, U1, and U2, may be used in a simulation schematic in some embodiments. In some embodiments, all the circuit component designs may be first added to a placement list. For a circuit component that corresponds to an existing extracted model, the existing extracted model may be placed in the simulation schematic. For another circuit component design for which no existing extracted models exist, a new extracted model may be constructed and placed into the simulation schematic.

It shall be noted that various techniques described herein do not require schematic designs to perform their intended functions to achieve their intended purposes although elements (e.g., schematic model or cellview symbols, connectivity, etc.) of schematic designs, regardless of whether these schematic designs are complete or partial, may nevertheless be used to reduce the computational resources and/or time needed to constructed a simulation schematic for an electronic design across multiple design fabrics in some embodiments.

A schematic model may include a schematic symbol and connectivity information for interconnecting the schematic symbol to external circuitry. The identified schematic models may be stored in a data structure such as a list, a table, a database, etc. For the ease of explanation or description, the data structure includes and will be referred to as a placement list although other types of data structures may also be used.

Schematic models, like schematic designs, may have the same format or different formats. For example, a PCB schematic design or a PCB schematic model therein may have a different format than an IC schematic design or an IC schematic model therein. In some embodiments, schematic models in different formats may be transformed into a format that is recognized by a native schematic editing tool in one of the multiple design fabrics. For example, PCB schematic models in a first format and IC package schematic models in a second format may be transformed into another format recognizable by an IC schematic editor. In some other embodiments, a new schematic model may be constructed for a schematic model in a different format.

In some embodiments, extracted models may be retrieved from existing sources or constructed anew for layout circuit designs in the layout. An extracted model includes a simplified model having a geometric entity to represent one or more layout circuit component designs in a simulation schematic in some embodiments. In some of these embodiments, an extracted model is placeable in a simulation schematic and includes model connectivity information (e.g., net names, port names, pin names, etc.) that may be used to interconnect the extracted model to one or more other models or external circuitry in the simulation schematic. These extracted models may also be stored in a data structure such as the aforementioned placement list.

In some embodiments, a simulation schematic may be constructed by placing the extracted models into the simulation schematic and further by interconnecting the extracted models with connectivity information extracted from the layout. In some embodiments where schematic cellview symbols or models are also identified for one or more layout circuit components that correspond to no extracted models or aggregated models, the schematic cellview symbols or models may also be placed in the simulation schematic. In addition or in the alternative, parasitic data extracted from the layout may also be stitched into or associated with the corresponding schematic cellview symbols or models or may be placed into the simulation schematic if these schematic cellview symbols or models are also placeable.

In some embodiments, the electronic design includes at least one PCB design having one or more IC package designs interconnected together and encompassing the one or more corresponding IC designs. A schematic model may include an object that includes a schematic symbol, some connectivity information for interconnecting the schematic model to external circuitry, and parasitic information in some embodiments. In some other embodiments, a schematic model may include a schematic cellview symbol or model that is retrieved from a schematic cellview data structure storing therein a plurality of schematic cellview symbols each having one or more parameters awaiting their corresponding one or more values to determine the characteristics or attributes of a specific circuit component that is represented by the schematic cellview symbol or model in a schematic design.

In some embodiments, the schematic cellview symbol or model for a particular layout circuit component may be elaborated by identifying the one or more corresponding parameter values such as names or identifications of the schematic circuit component design represented by the symbol, nets, ports, pins, layer(s), instance(s), etc., interface or interfaces, connectivity information for interconnecting the interface or interfaces to external circuits, or any other information suitable for creating a schematic cellview symbol or model to uniquely represent one or more such schematic circuit component designs in a schematic design.

In some embodiments, layout circuit component designs may be extracted from one or more layouts of the electronic design spanning across multiple design fabrics. In some embodiments, these layout circuit components or information therefor (e.g., identifications of layout circuit component designs with pointers, link structures, or symbolic links to these layout circuit component designs) may be stored in a data structure such as a list, a table, a database, etc. such as a placement list.

One or more layout extracted models corresponding to the one or more identified layout circuit component designs may be retrieved or extracted from a non-transitory computer accessible storage medium or device. In some embodiments where no extracted models are available for certain layout circuit component designs, additional extracted models may be constructed anew for these certain layout circuit component designs. An extracted model includes a simplified model to represent one or more layout circuit component designs in a simulation schematic in some embodiments.

In some of these embodiments, an extracted model is placeable in a simulation schematic and includes model connectivity information (e.g., net names, port names, pin names, etc.) that may be used to interconnect the extracted model to one or more other models or external circuitry in the simulation schematic. In addition or in the alternative, an extracted model may further include parasitic information that is stitched into or associated with the elements (e.g., circuit components, traces, wires, interconnects, etc.), parasitic models encompassing the parasitic information, or a combination thereof.

In some embodiments, existing parasitic models indicative of parasitic information or data of one or more layout circuit components may be identified. A parasitic model may include an s-parameter or SPICE model that represents the R/L/C parasitics of the traces, interconnects, and/or metal structures in an electronic design. In some embodiments where parasitic models are unavailable for certain layout circuit component designs, new parasitic models may be constructed by extracting the corresponding parasitic information or data for these layout circuit component designs from the layout.

In some embodiments, connectivity may include, for example, how various circuit component designs in the PCB layout are connected, the terminal order and/or identifications of an interface of a circuit component design, and/or a mapping to a split symbol instances or nets, etc. in some embodiments. A testbench may be created at by updating the simulation schematic via cross-probing, updating parameter values, and/or modifying the underlying electronic design in some embodiments.

In some embodiments, a layout versus schematic check may be performed on the testbench created at by referencing the PCB layout in some embodiments to cross check the correctness of the testbench, the simulation schematic, and/or the PCB layout. In some embodiments where the PCB schematic is available, a schematic versus schematic check may also be performed on the simulation schematic or the testbench by referencing the PCB schematic to cross check the correctness of the testbench, the simulation schematic, and/or the PCB schematic.

In some embodiments, the testbench may be represented in a hierarchical structure at according to the hierarchical structure of the PCB design in some embodiments or in a flat structure having only one hierarchical level in some other embodiments. Simulations may be performed with the simulation schematic to generate simulation results including, for example, waveforms of signals, etc. In some embodiments where the PCB schematic is available, the PCB schematic may also be associated with the simulation results generated previously.

As used herein, the phrase "stimulus" may refer to a voltage signal applied as per device properties. The phrase "electrical stress" may refer to a measure of a given component's operating conditions with respect to maximum ratings. An "analog topology" may refer to a portion of a schematic that impacts the device under test. This portion if analyzed for simulations suffices the analysis of device for certain purposes like stress.

Figure 2:
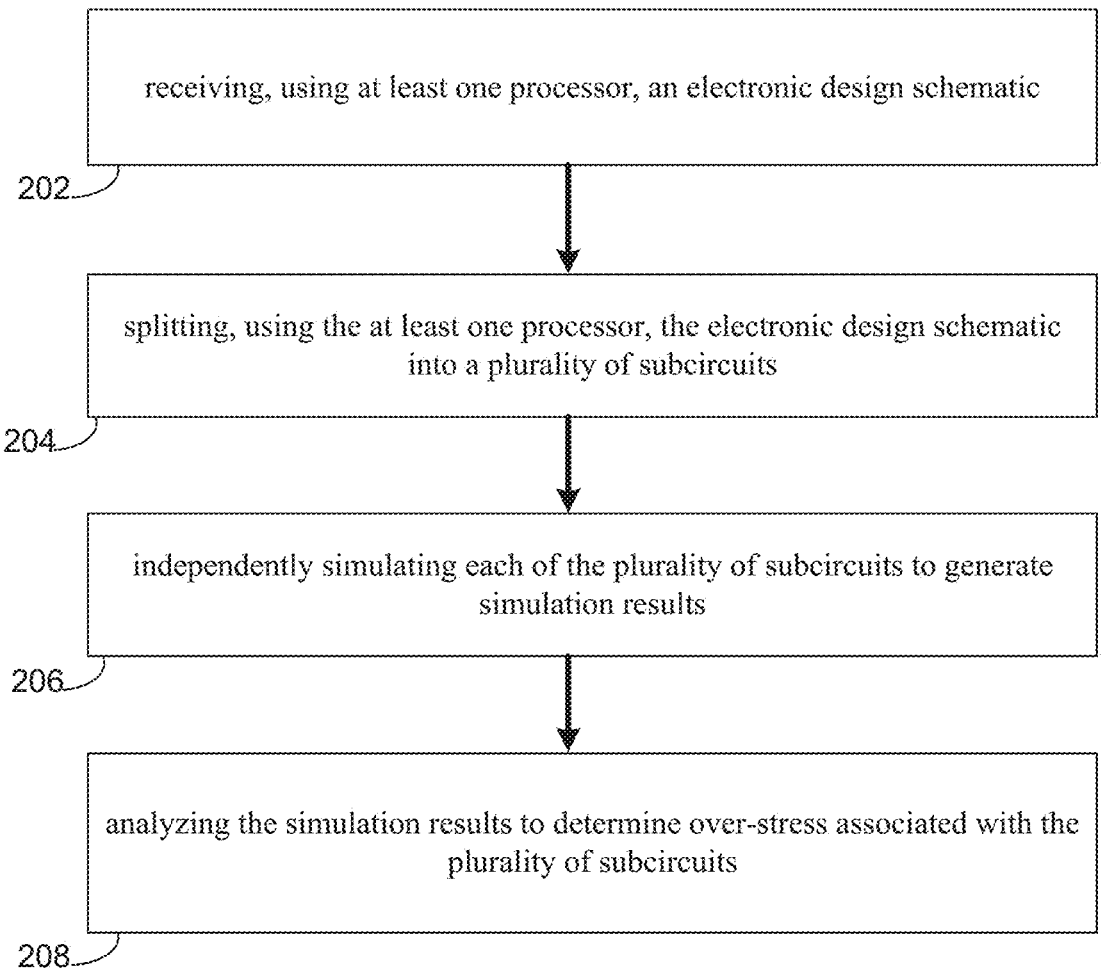
FIG. 2 illustrates a flowchart depicting operations consistent with embodiments of overstress identification process.

FIG. 2 illustrates a high-level flowchart that includes one or more operations that may be employed for use in an electronic design environment is provided. The method may include receiving (202), using at least one processor, an electronic design schematic and splitting (204), using the at least one processor, the electronic design schematic into a plurality of subcircuits. The method may further include independently simulating (206) each of the plurality of subcircuits to generate simulation results and analyzing (208) the simulation results to determine over-stress associated with the plurality of subcircuits.

Figure 3:
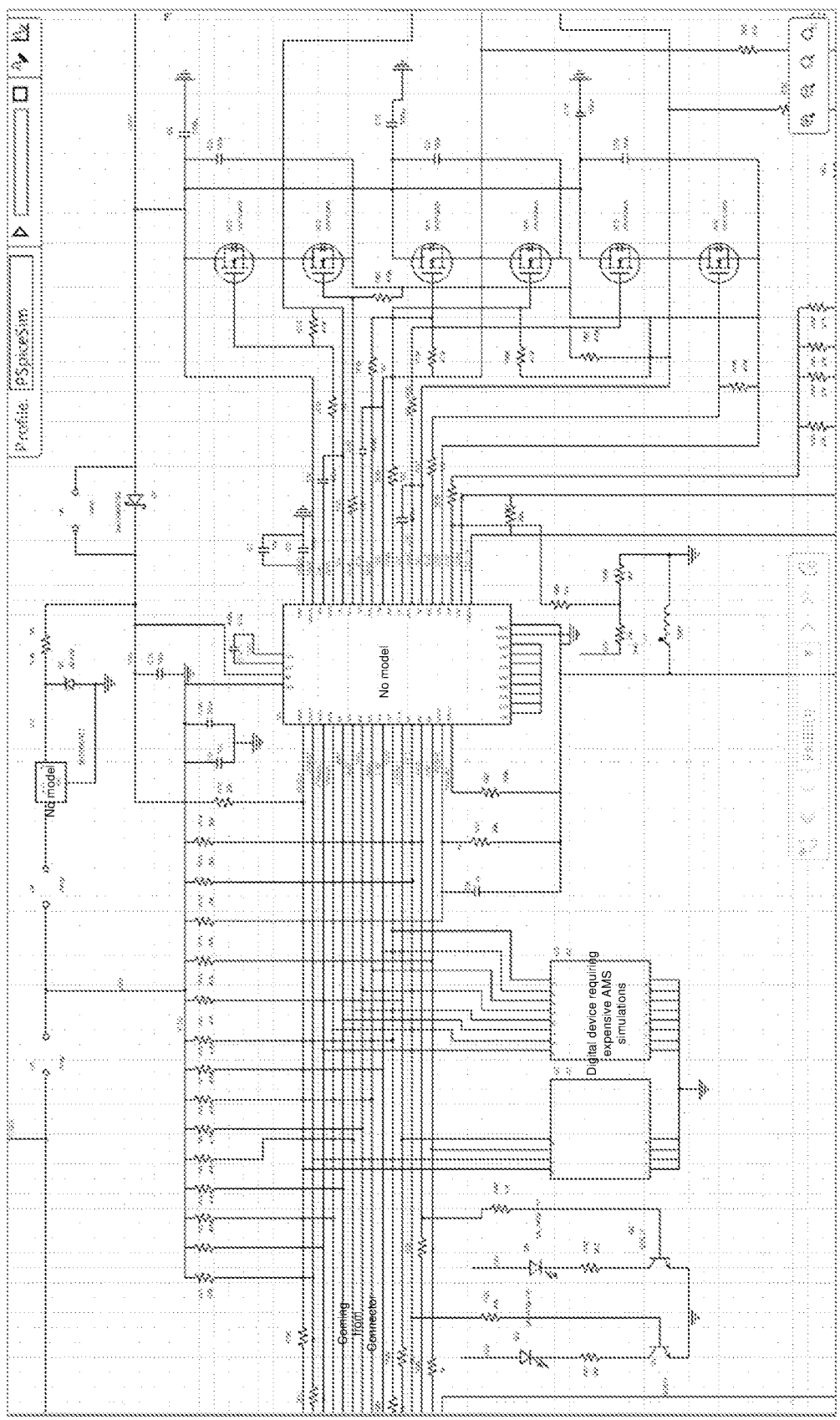
FIG. 3 illustrates an example of a circuit that cannot be simulated due to an absence of models.

Referring now to FIG. 3, an embodiment showing an example circuit using existing approaches is provided. In this example, the circuit cannot be simulated due to the absence of models. Existing approaches generally involve the manual creation of multiple small circuits. In these approaches, a sub-schematic may be manually created with appropriate stimulus to represent the interface of a sub-schematic with the rest of the system-schematic. It becomes cumbersome to create such circuits manually for 1000s of devices on a PCB-board. Some of these approaches utilize DC calculations and do not perform time-domain simulations. As such, this information lacks details such as ripple, signal and peaking. Other approaches utilize transient simulations, however then the user may need to simulate the complete circuit which is not possible for large PCBs.

Accordingly, embodiments of the present disclosure provide for the automatic extraction of small sub-circuits from a PCB design. These may be independently simulated for purposes of estimating figures of merit for a PCB. In some embodiments, the process may intelligently hook stimulus through the use of IO-technology of interface-pins. The term "hooking" as used herein, may refer to connecting the stimulus to a circuit for the purpose of simulation.

In some embodiments, the process may be configured to calculate stress analysis of PCB device, trace-thickness based on estimated transient currents, as well as creepage distances on a particular PCB. The term "creepage", as used herein, may relate to the distance between two conducting tracks on a PCB. This distance should be more than certain threshold to avoid spark-over from one trace to another due to a large voltage difference. The term "trace-thickness" generally refers to the width*height of a copper track made on a PCB in order to establish a connection. The term "stress" may imply electrical stress on a device or a connecting track due to high current, voltage, power-dissipation, temperature-rise etc.

Figure 4:
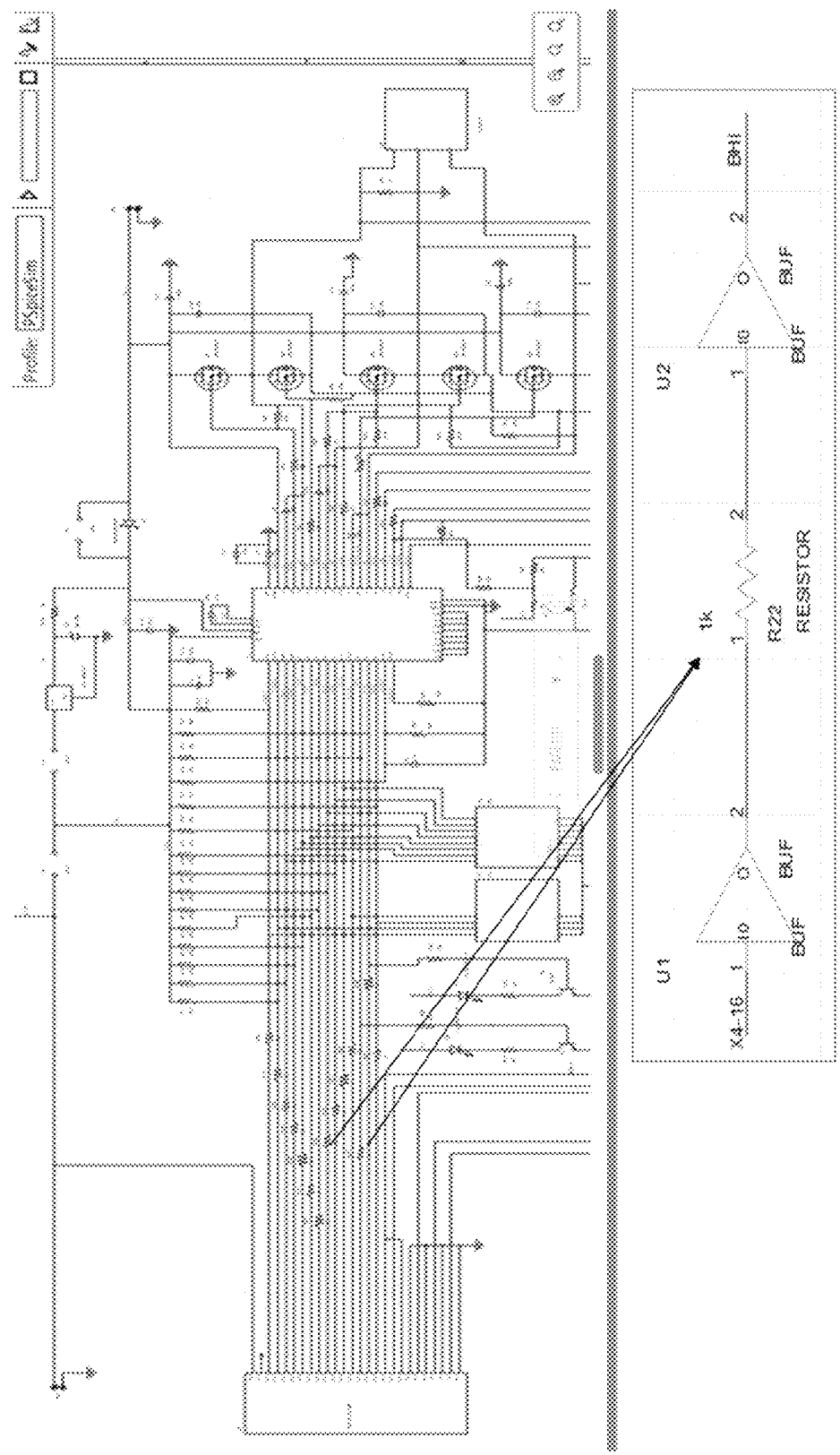
FIG. 4 illustrates an example showing an extraction of a small circuit.
Figure 5:
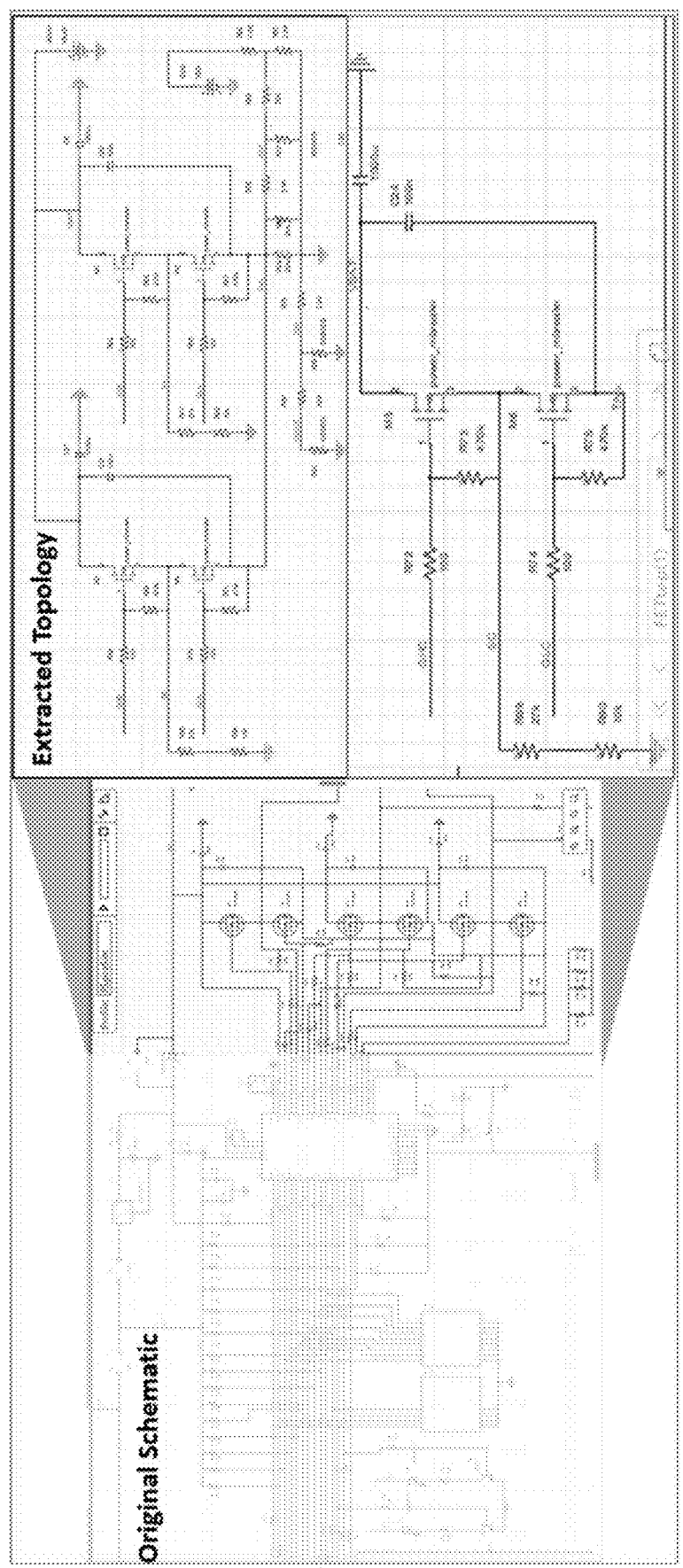
FIG. 5 illustrates another example showing an extraction of a small circuit.

Referring now to FIG. 4, an embodiment showing an example graphical user interface is provided. In this particular example, the extraction of a small circuit is shown. FIG. 5 shows an additional example depicting an original schematic and an extracted topology or subcircuit.

Figure 6:
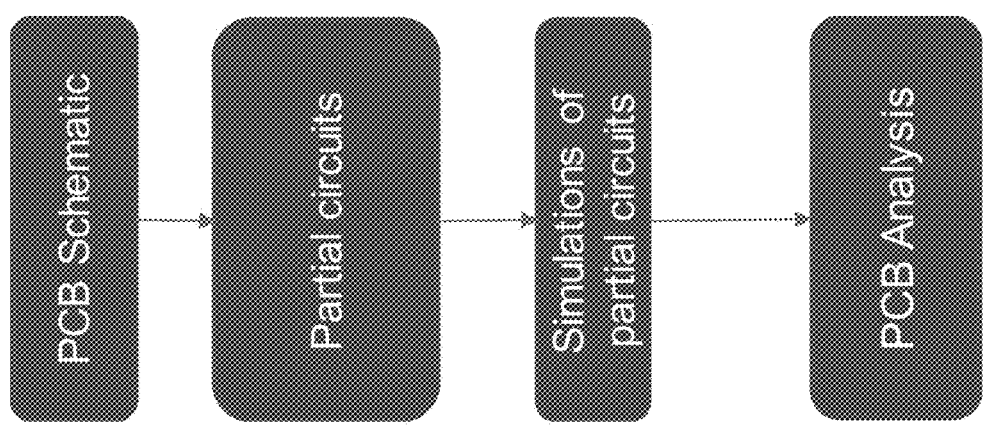
FIG. 6 illustrates a flowchart depicting operations consistent with embodiments of overstress identification process.

Referring now to FIG. 6, an embodiment showing an example flowchart consistent with the overstress determination process is provided. In some embodiments, an electrical schematic may be automatically split into multiple small circuits. Each small circuit may be simulated independently of other. In some embodiments, the automatic hook of stimulus may be performed at nodes where the small-circuit breaks from main circuit. Simulation results may then be analyzed to determine stress on devices associated with the PCB.

Figure 7:
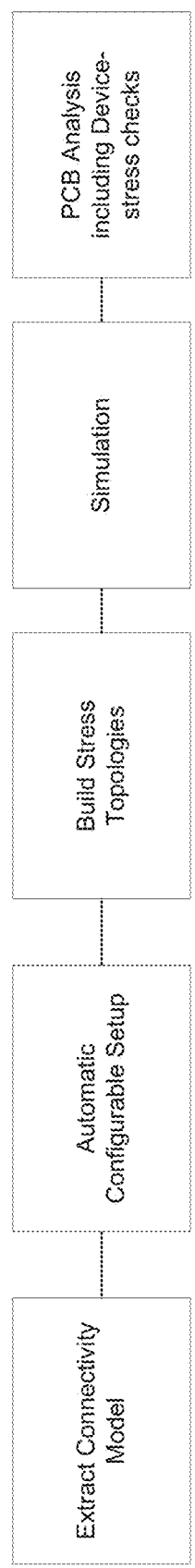
FIG. 7 illustrates a diagram showing operations consistent with embodiments of overstress identification process.

Referring now to FIG. 7, an embodiment showing an example diagram consistent with the overstress determination process described herein. The process may include extracting a connectivity model where a schematic netlist may be parsed and processed. This may create a data model of the netlist in memory. The process may further include an automatic/configurable setup, which may include, but is not limited to, device types and subtypes, global nets, ground aliases, and default load impedance and stimulus. The process may then build stress topologies. Some portions of a circuit may be able to be simulated whereas non-simulatable portions may include IC pins at a topology boundary. The process may be configured to automatically detect stimulus pins and load pins to complete the circuit. In some embodiments, the stimulus may be applied automatically based on pin-properties of the stimulus pins. In some embodiments, the simulation may include using a SPICE simulator to simulate one or more stress topologies as well as performing a transient analysis. The output may be in the form of a result file having the voltage, current, and power at all the nodes of the topology. In some embodiments, the process may read the maximum operating values per device from a part-library and generate a control-file that contains the maximum operating conditions for each device and the tests to run. Simulation results may be post-processed and compared against maximum values for displaying results.

Figure 8:
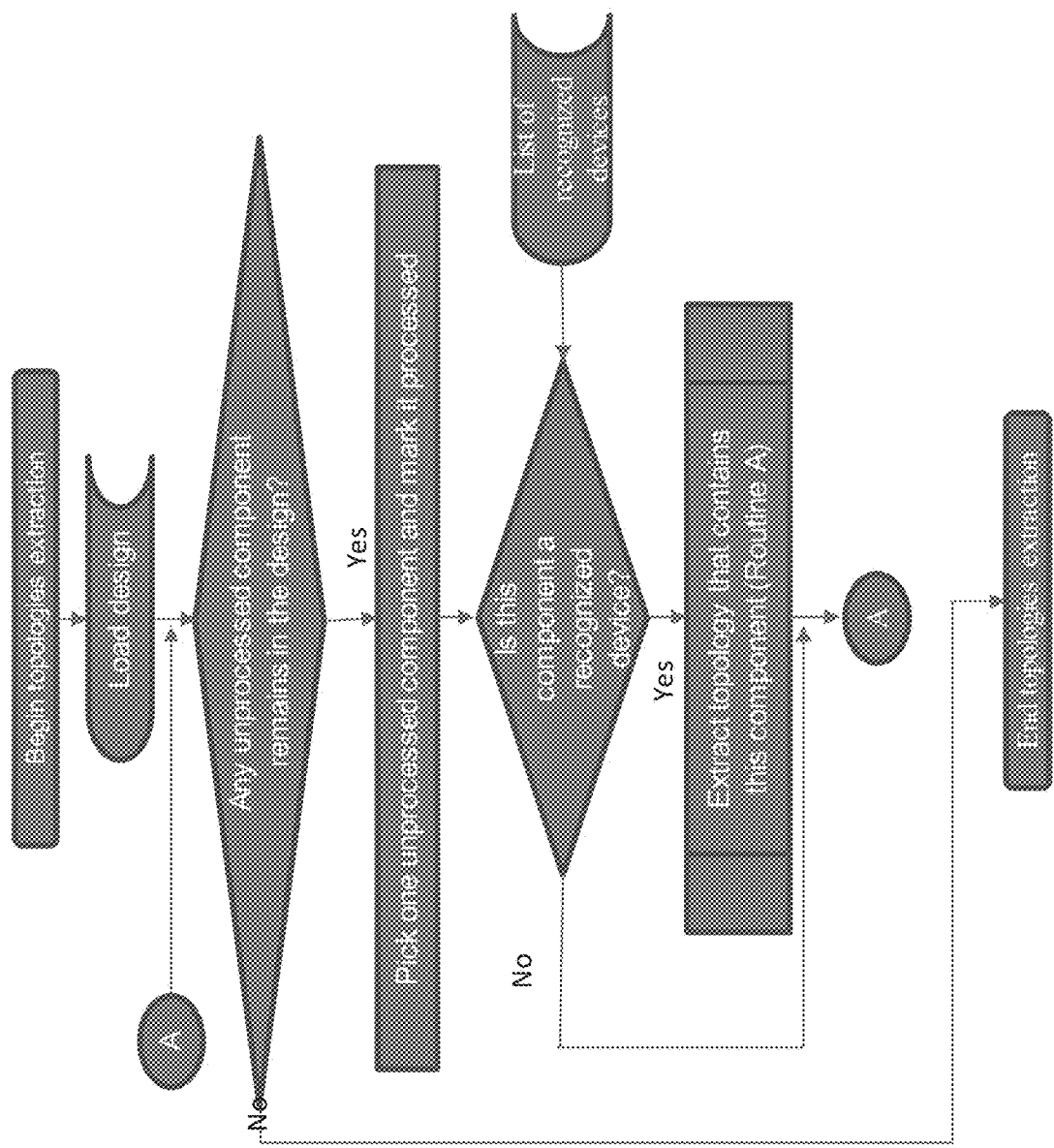
FIG. 8 illustrates a flowchart depicting operations consistent with embodiments of overstress identification process.
Figure 9:
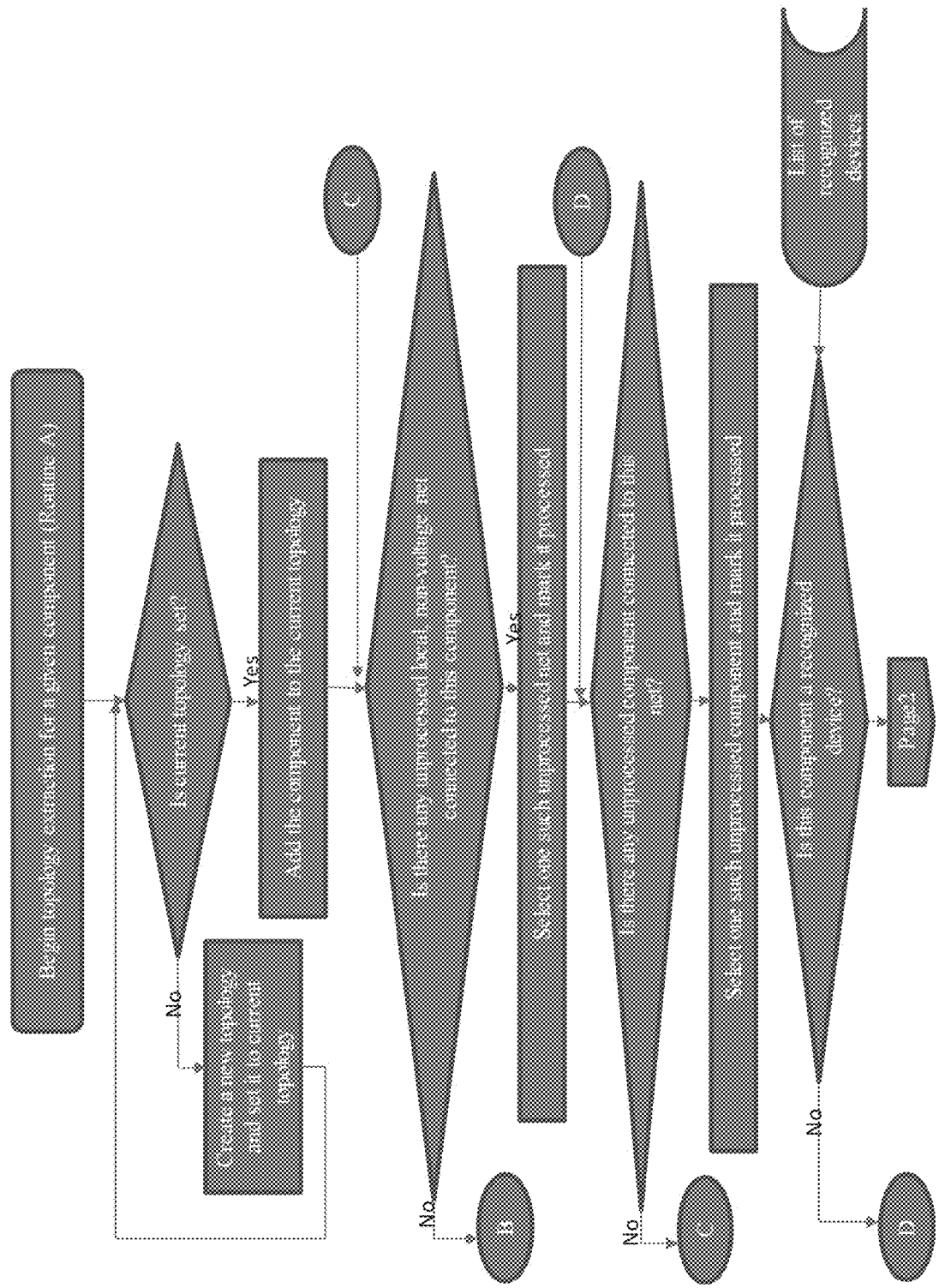
FIG. 9 illustrates a flowchart depicting operations consistent with embodiments of overstress identification process.
Figure 10:
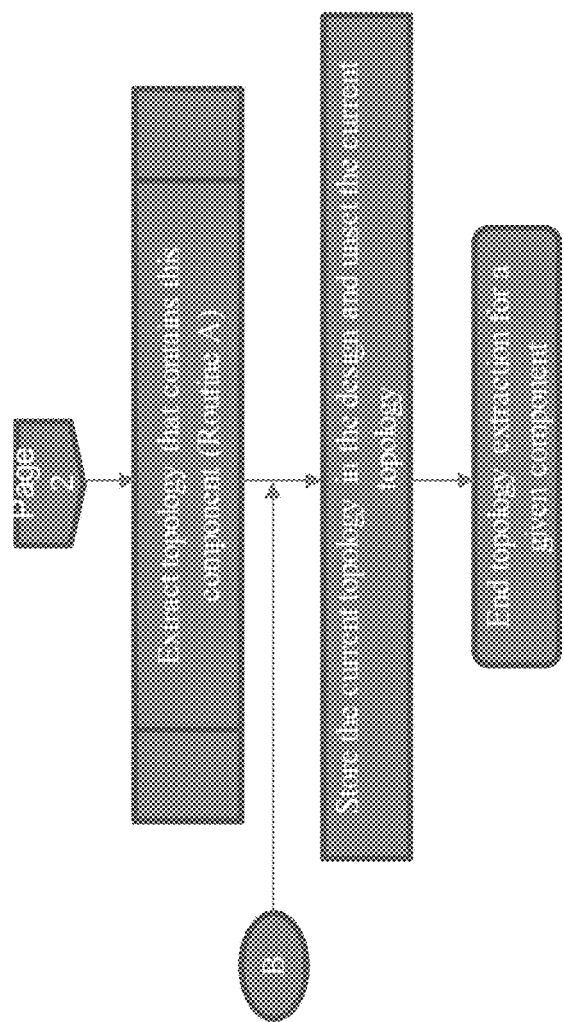
FIG. 10 illustrates a flowchart depicting operations consistent with embodiments of overstress identification process.

Referring now to FIGS. 8-10, an embodiment showing an example flowchart consistent with overstress determination process is provided. In operation, the process may include selecting a device and estimating its category. Some devices may include, but are not limited to, resistors, inductors, capacitors, etc. Device-category detection and processing of abstract-data helps select default-model for device. The process may keep iterating over all nets connected to pins of this device until it hits another device. The process may continue iterating on the next device and the iteration may stop when either the device-pin is connected to Power-signal (VDD/GND . . . ), the device-pin is connected to pin of IC, and/or the device-pin is connected to un-identifiable category of device. The process may be configured to detect stimulus points of topology based upon, at least in part, whether a device-pin is an IC pin, an unrecognized device pin, a power-pin, etc. Accordingly, pulse-stimulus, load or power may be applied to enable simulations. Apply a stimulus that reflects a typical close-loop condition.

Figure 11:
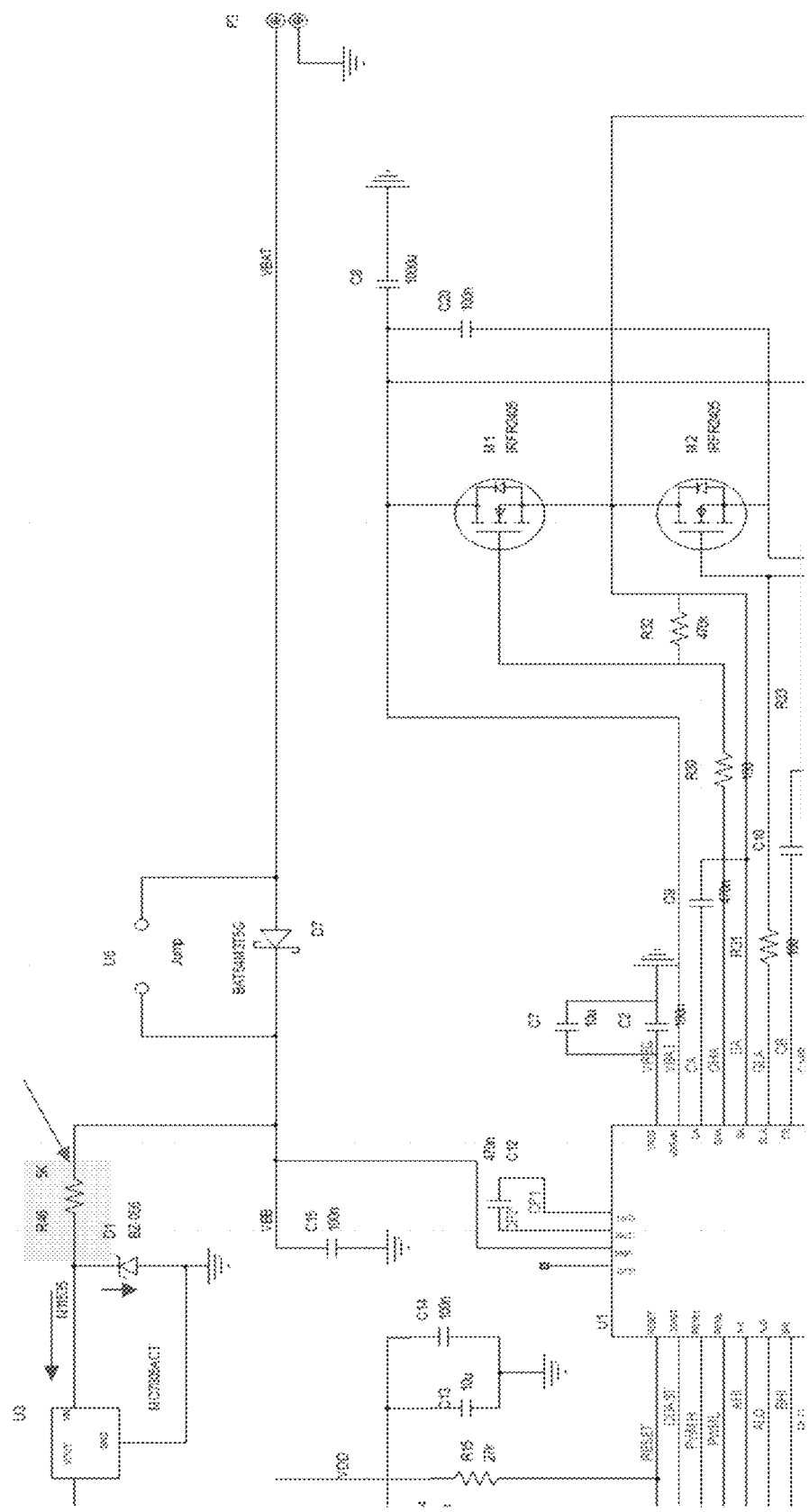
FIGS. 11-18 illustrate diagrams showing a proposed example consistent with embodiments of overstress identification process.
Figure 12:
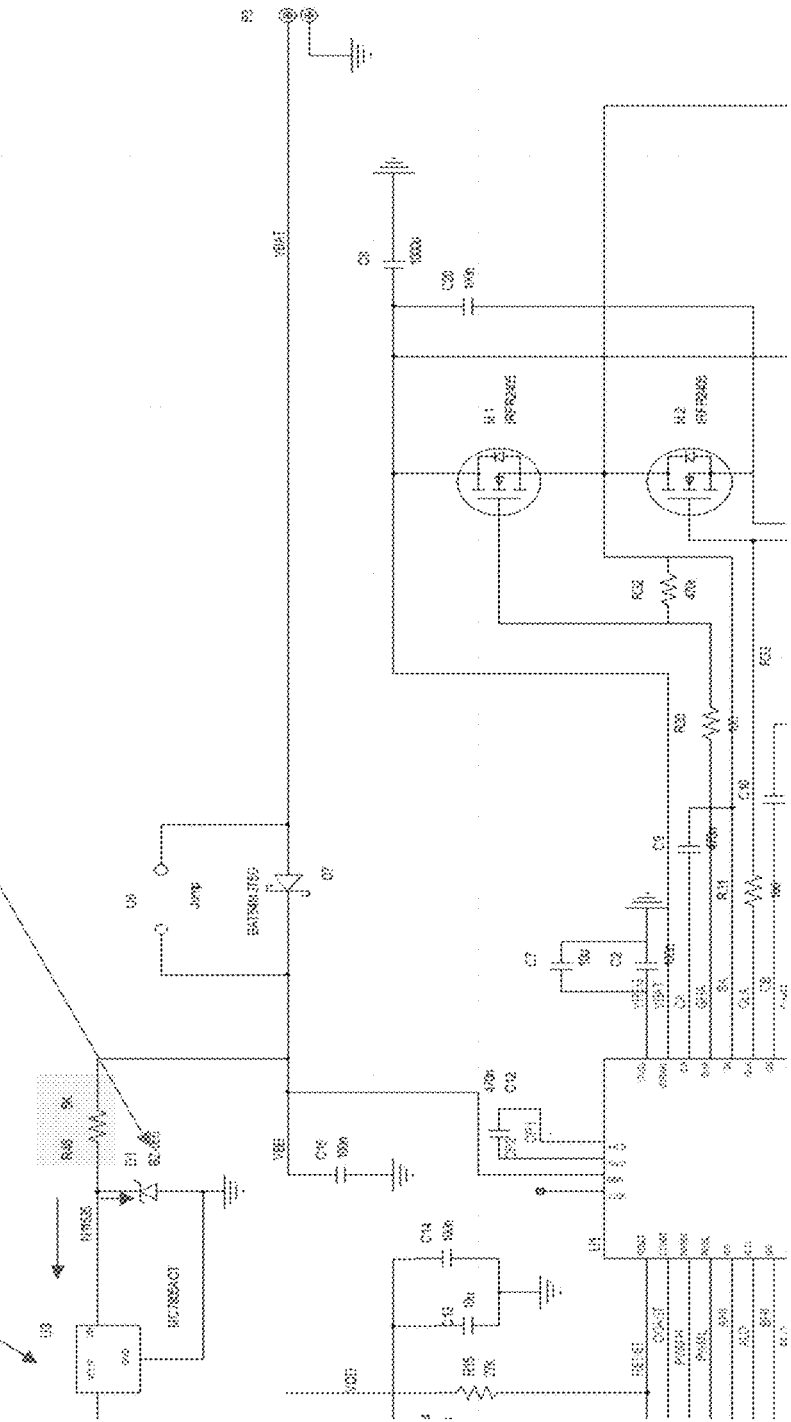

Referring now to FIG. 11, an embodiment showing an example diagram consistent with an overstress determination process is provided. In operation, the process may include selecting an unprocessed component that is a recognized device and following its unprocessed connections one-by-one after marking it processed. As shown in FIG. 12, if a device is not recognized the process may stop at that device and mark it as processed. However, if the device is recognized the traversal may continue in a depth-first manner after marking the device as having been processed and adding it to the current topology. The phrase "depth-first" may refer to an approach whereby the circuit is treated as a tree and each branch of the tree may be traversed until reaching the leaf level nodes. This may occur prior to backtracking and exploring other branches of the tree.

Figure 13:
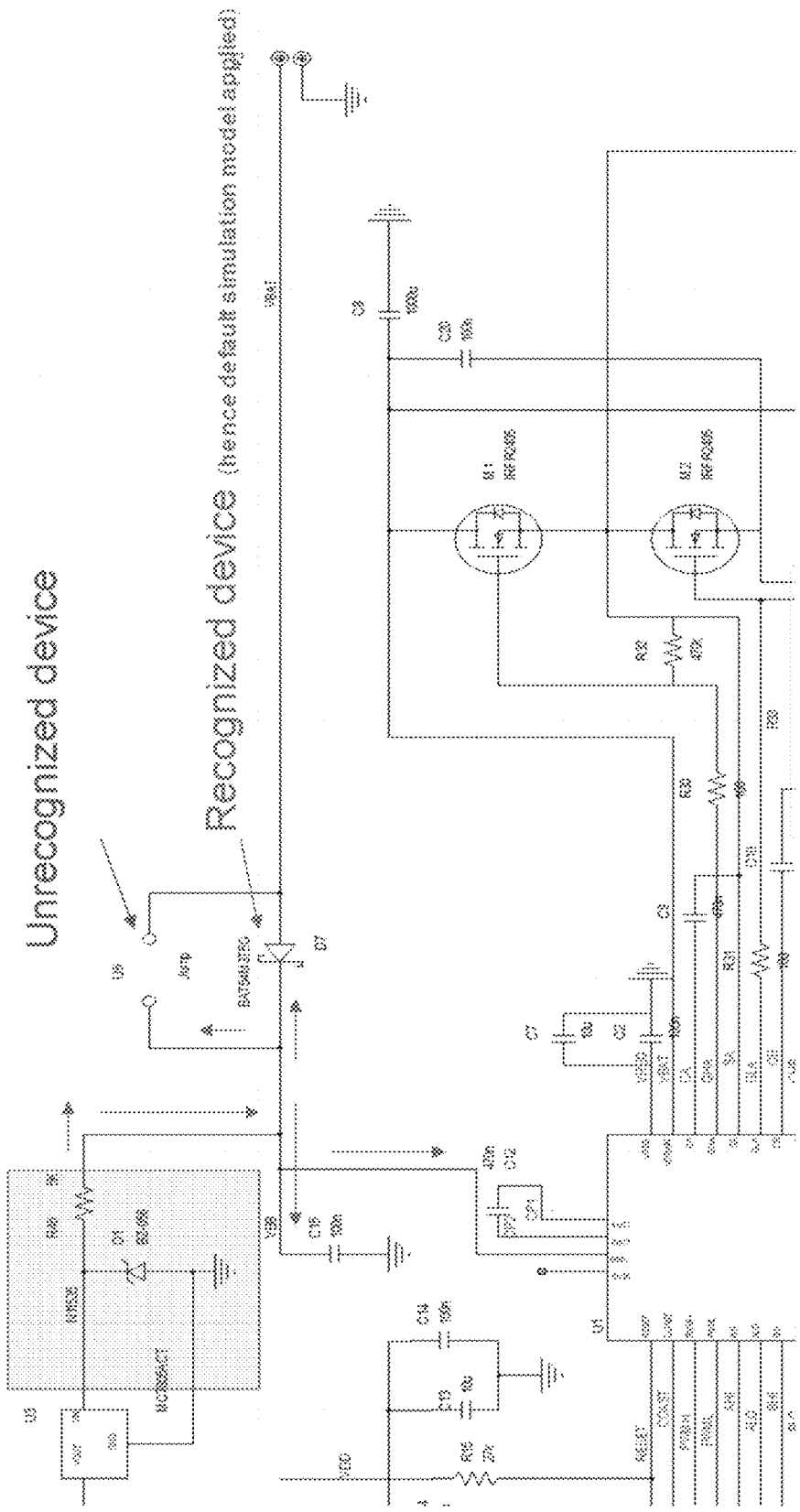

As shown in FIG. 13, in some embodiments if there are no further connections to recognized devices on the diode, the process may backtrack to the resistor and select another unprocessed connection and traverse that connection. A recognized device may have a default simulation model applied.

Figure 14:
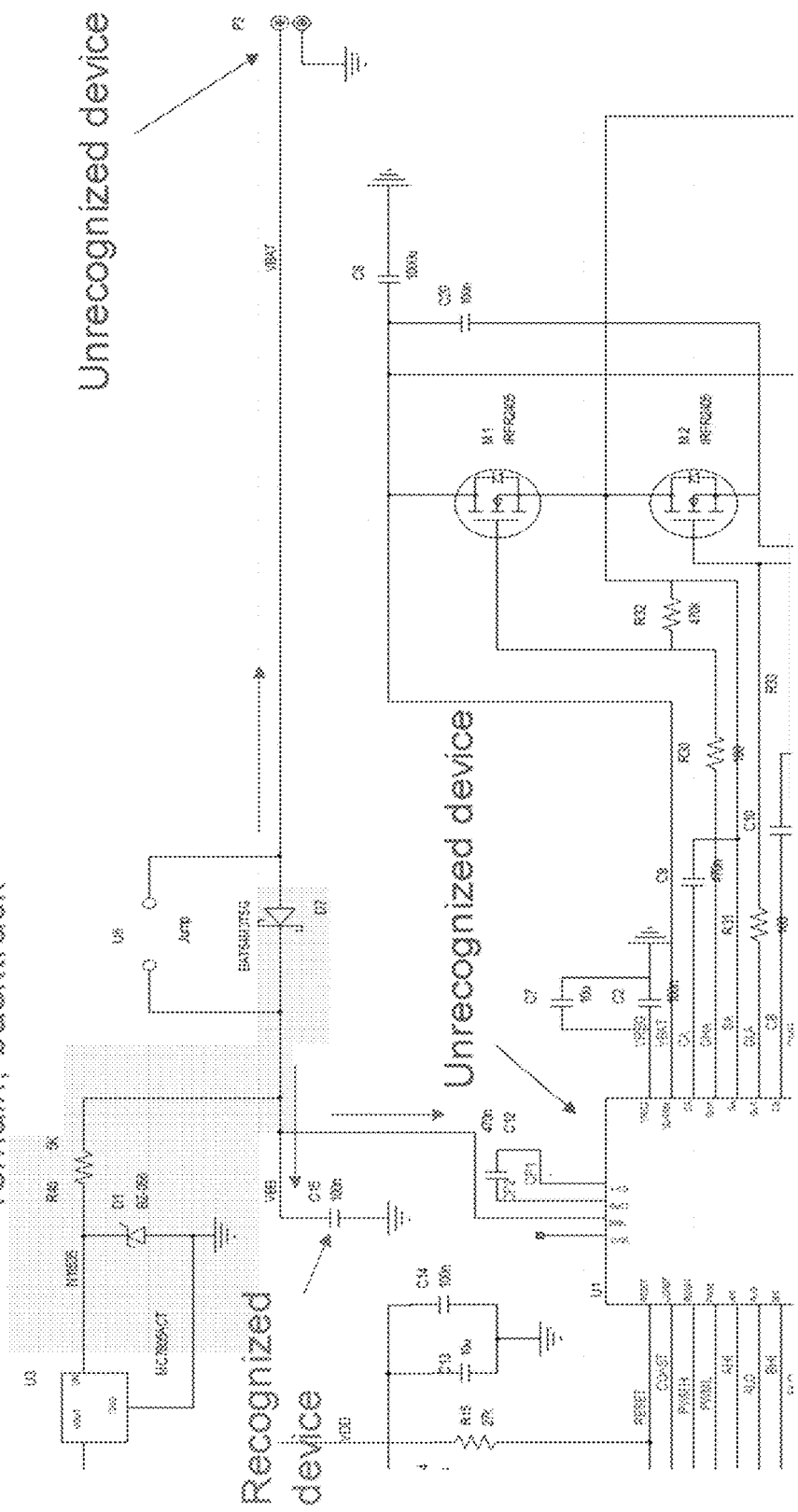

As shown in FIG. 14, examples of recognized and unrecognized devices are provided. In operation, the process may add the recognized device to the current topology, mark it as processed and keep on following its remaining unprocessed connection. If no unprocessed connections remain, the process may backtrack.

Figure 15:
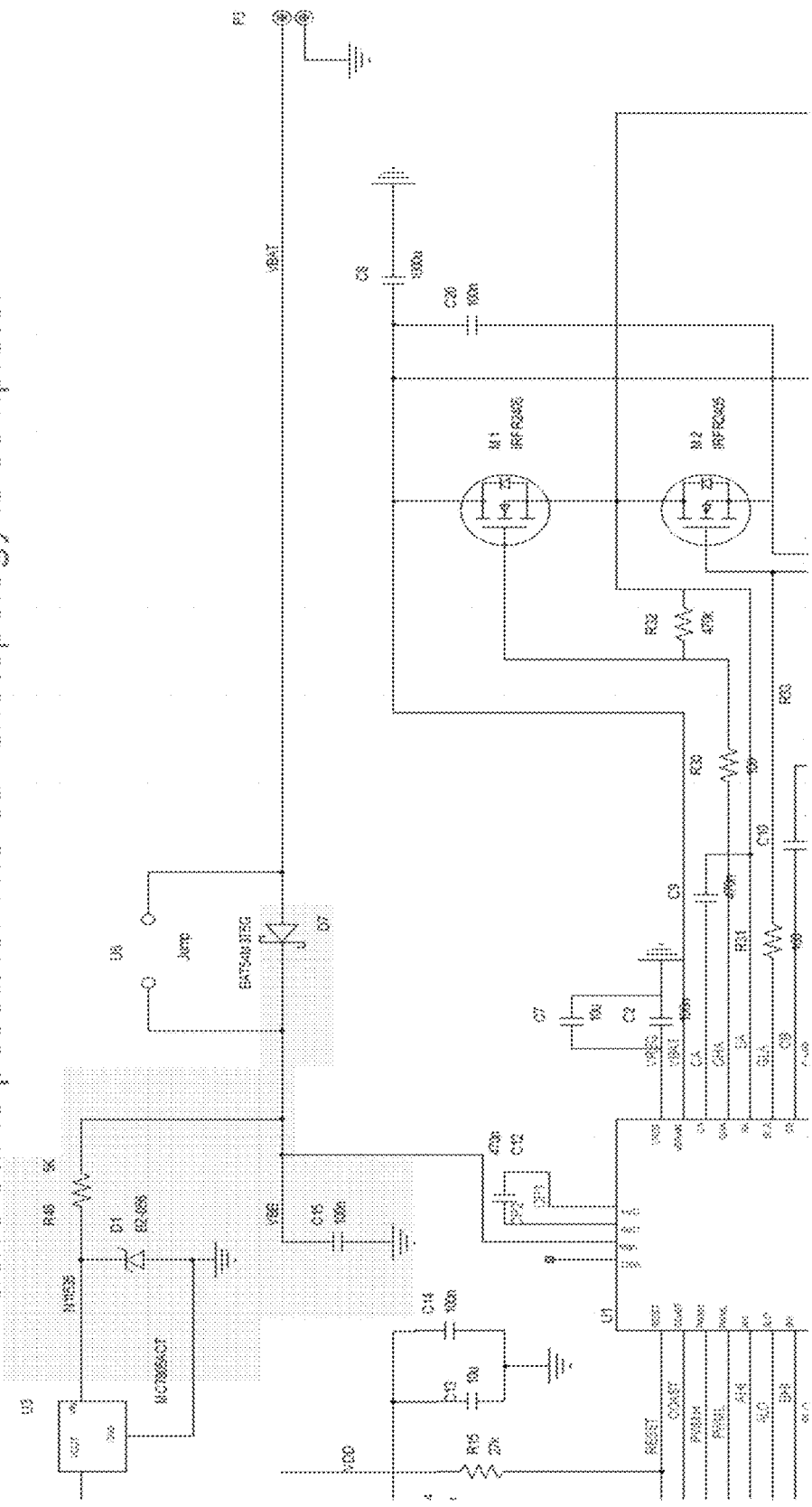
Figure 16:
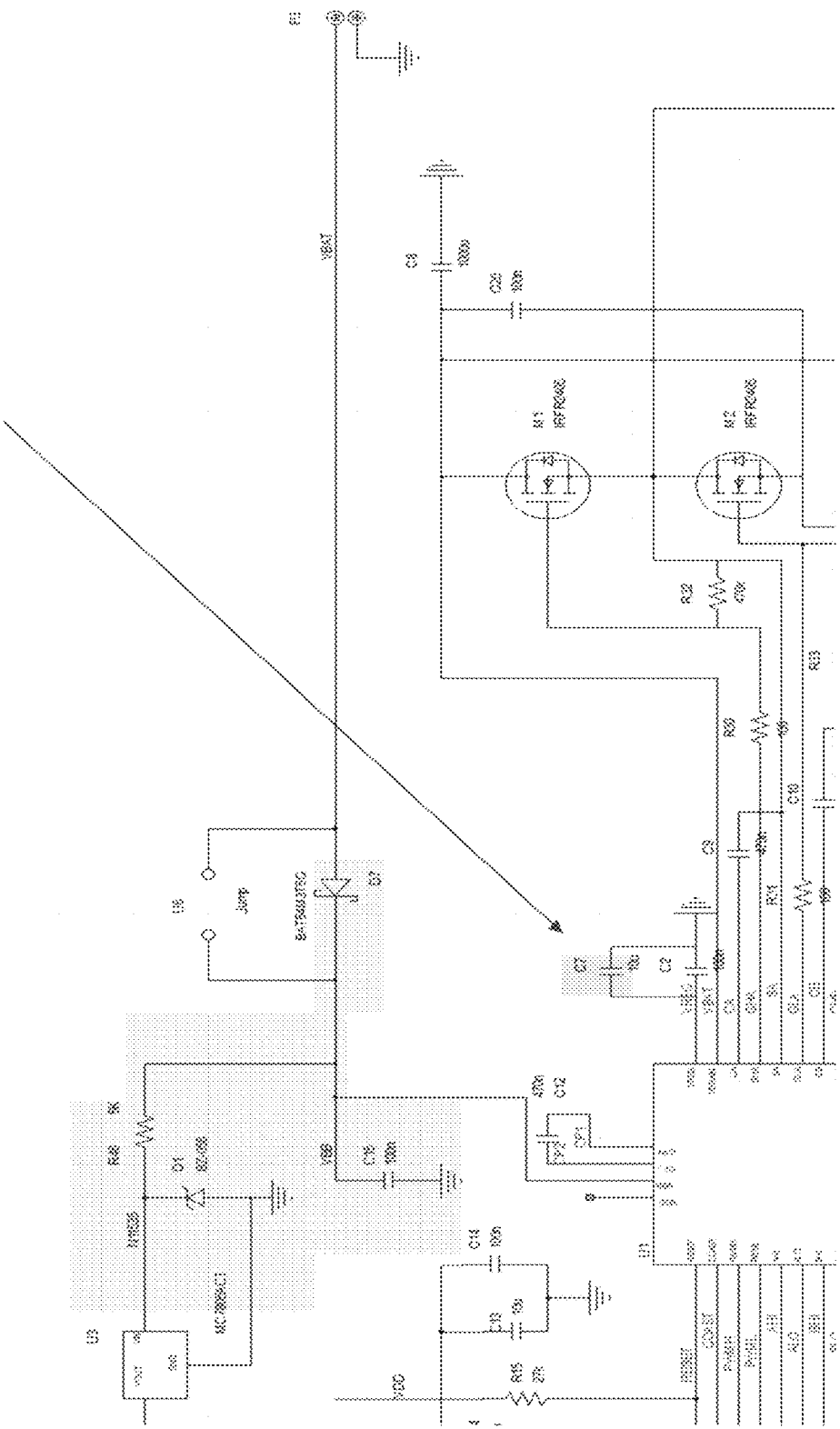
Figure 17:
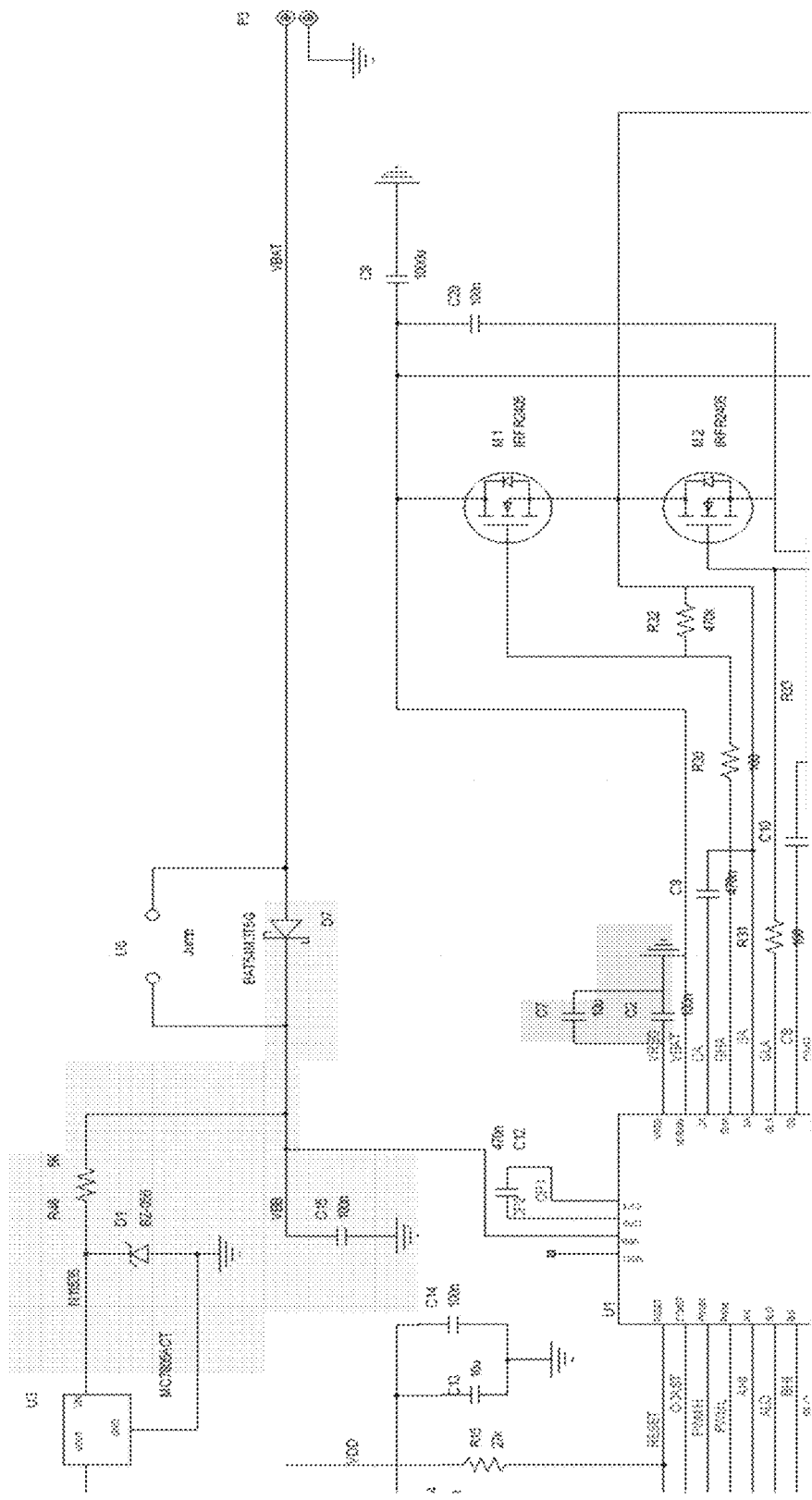
Figure 18:
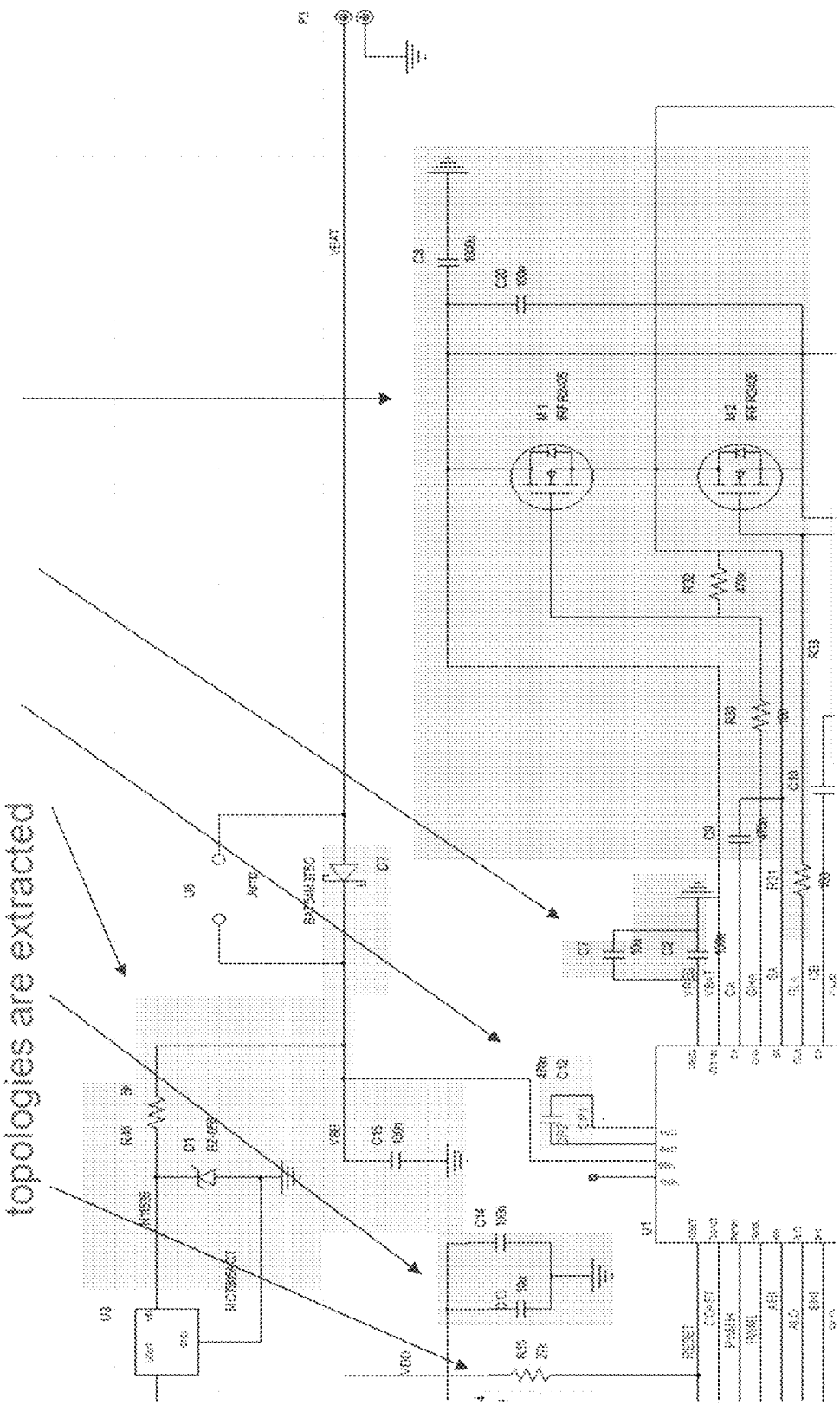

As shown in FIG. 15, in some embodiments the process may add the recognized device to the current topology, mark it as processed and proceed following its remaining unprocessed connection. If no unprocessed connections remain, the process may backtrack. The process may stop when no further traversal is possible. The topology may be complete at this point. FIG. 16 shows another unprocessed component that may be selected to initiate a new topology. The same operations as described above may be used for this new component. The process may continue for each component as shown in FIGS. 17-18.

Figure 19:
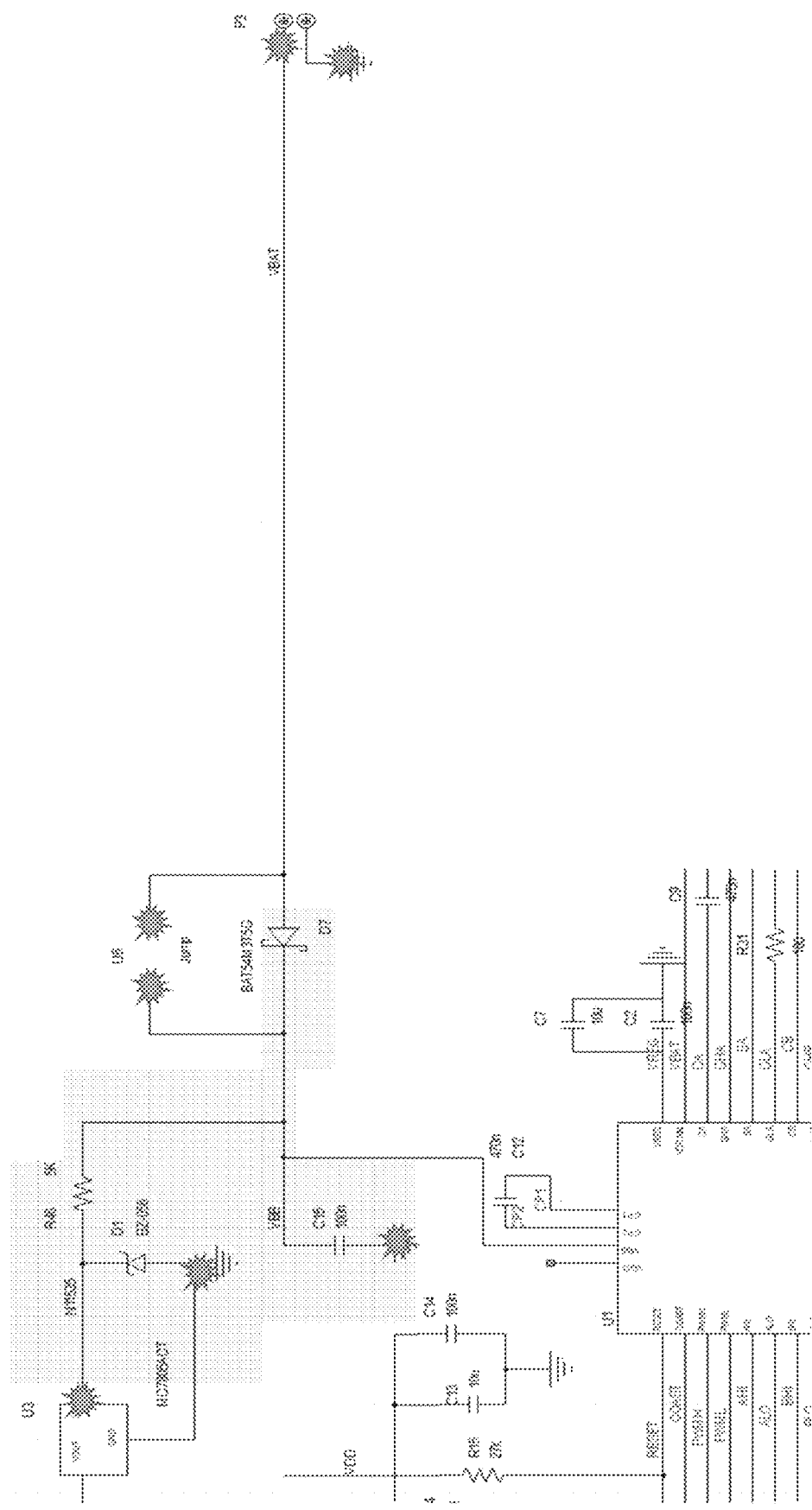
FIG. 19 illustrates a diagram enabling simulation through a stimulus application.
Figure 20:
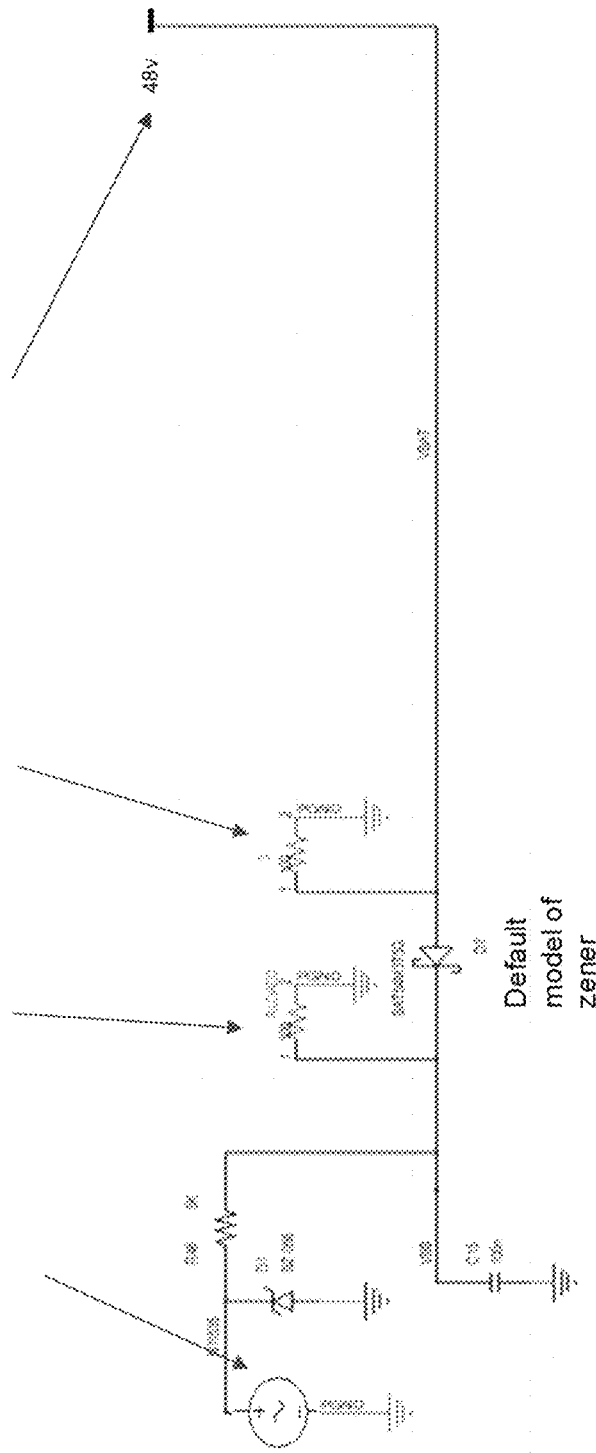
FIG. 20 illustrates a diagram enabling simulation through a stimulus application.

Referring now to FIGS. 19-20, an example embodiment showing the application of a stimulus to enable simulation is provided. As shown in FIG. 19, stimulus points of topology may be detected. For example, interface pins of IC, interface pins of unrecognizable device, GND, VDD nets, etc. As shown in FIG. 20, for each topology, the process may apply a stimulus and load to one or more relevant IC (non-recognized device) interface pins to complete the circuit. In this particular example, a pulse may be applied based upon IO technology (or pin properties) of a pin. For example, a transistor-transistor logic ("TTL") IO-pin would have a pulse of 0 to 5V with certain rise/fall times. For an interface pin of an unrecognized device, the process may apply loads with high impedance and for GND or VDD nets the process may apply voltages as indicated by labels on nets.

Embodiments of the present disclosure may be used for simulating large PCBs for useful calculations like device-stress, trace-thickness, creepage, etc. Such partitioning into small circuits may speed up simulations significantly. Since each device may now be associated with a small circuit, it may be debugged in the context of same small circuit. Repeated circuits need to be simulated just one time, which increases efficiency. In some embodiments, results of such simulations may be used for estimating conducted emissions, estimating trace-thicknesses and creepage-clearances, etc.

In some embodiments, the overstress determination process included herein may be used to simulate a PCB circuit by automatically splitting one or more circuits into small simulate-able circuits in order to compute device-stress. This may be achieved without requiring simulation models. In some embodiments, the process may include extracting a sub-circuit (estimated topology) using one or more of bias-nets, digital-nets and connectors as terminating interfaces. The process may include a method of hooking stimulus using pin information. When a stressed model is selected the process may include displaying a portion of design as highlighted.

Referring now to FIGS. 21-28, embodiments of the present disclosure depicting cross-probing capabilities are provided. As used herein, the phrase "cross probing" may refer to navigation from one view to a second, related view.

Figure 21:
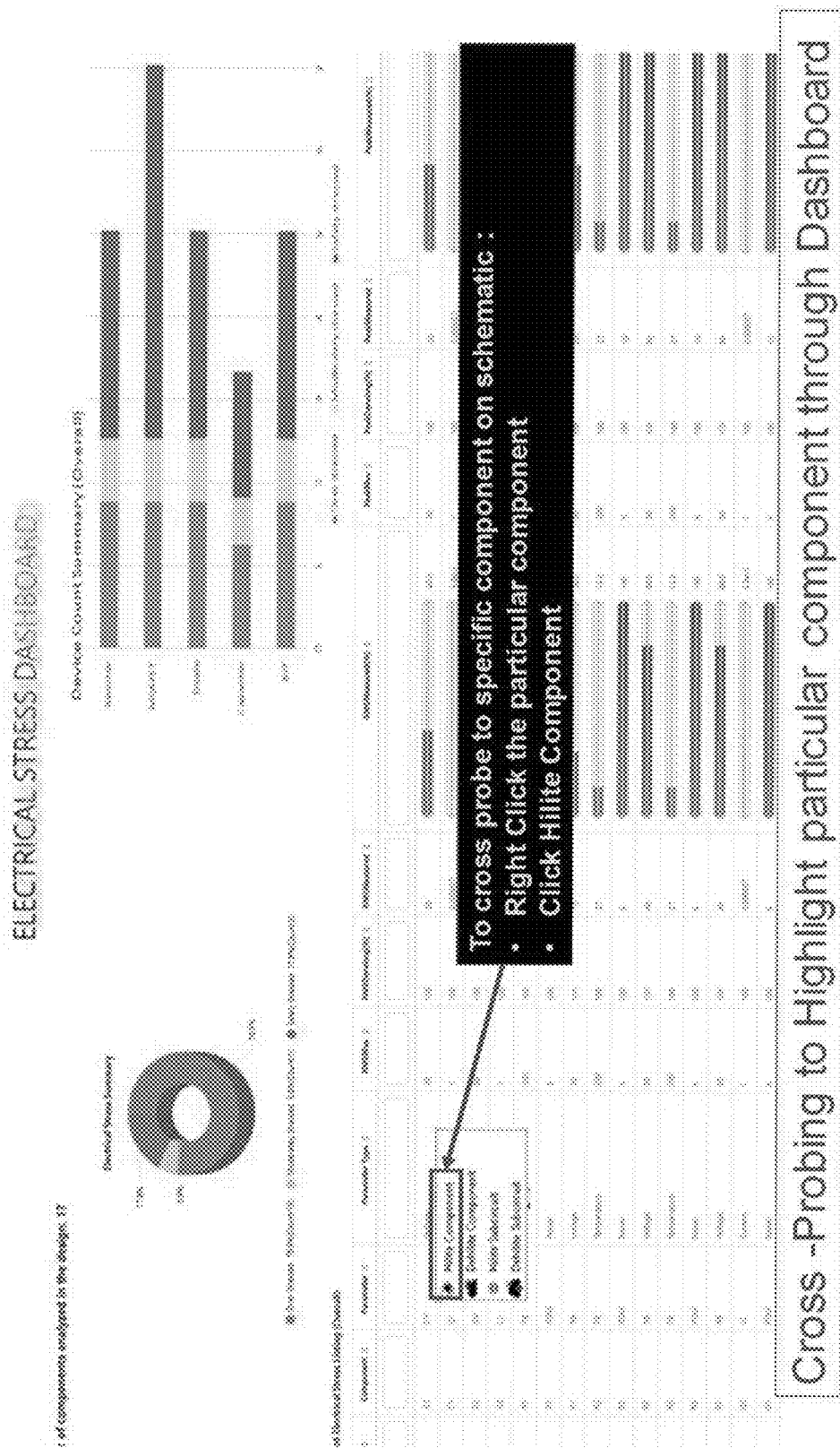
FIG. 21 illustrates an example showing cross-probing consistent with embodiments of overstress identification process.
Figure 22:
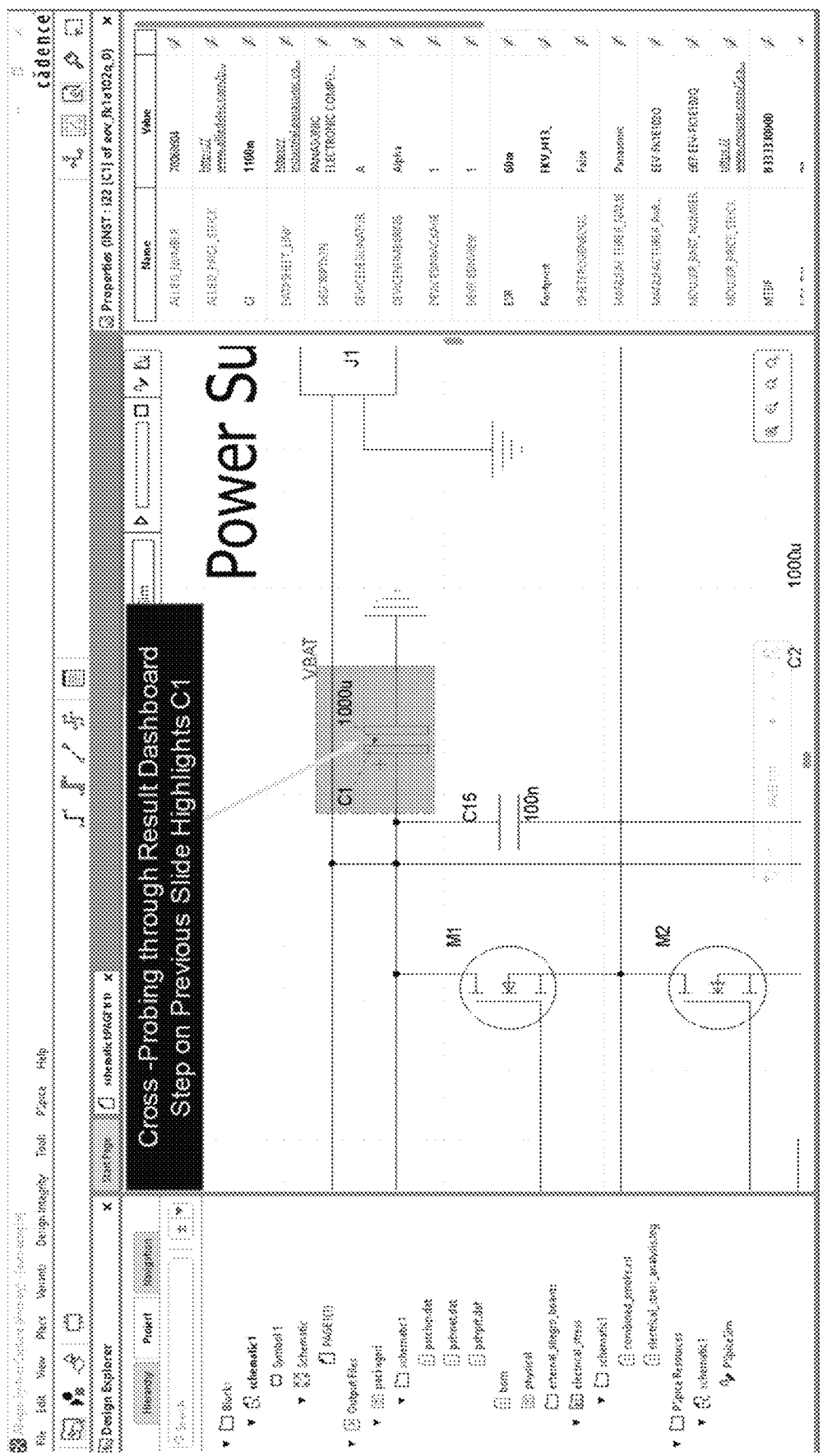
FIG. 22 illustrates an example showing cross-probing consistent with embodiments of overstress identification process.
Figure 23:
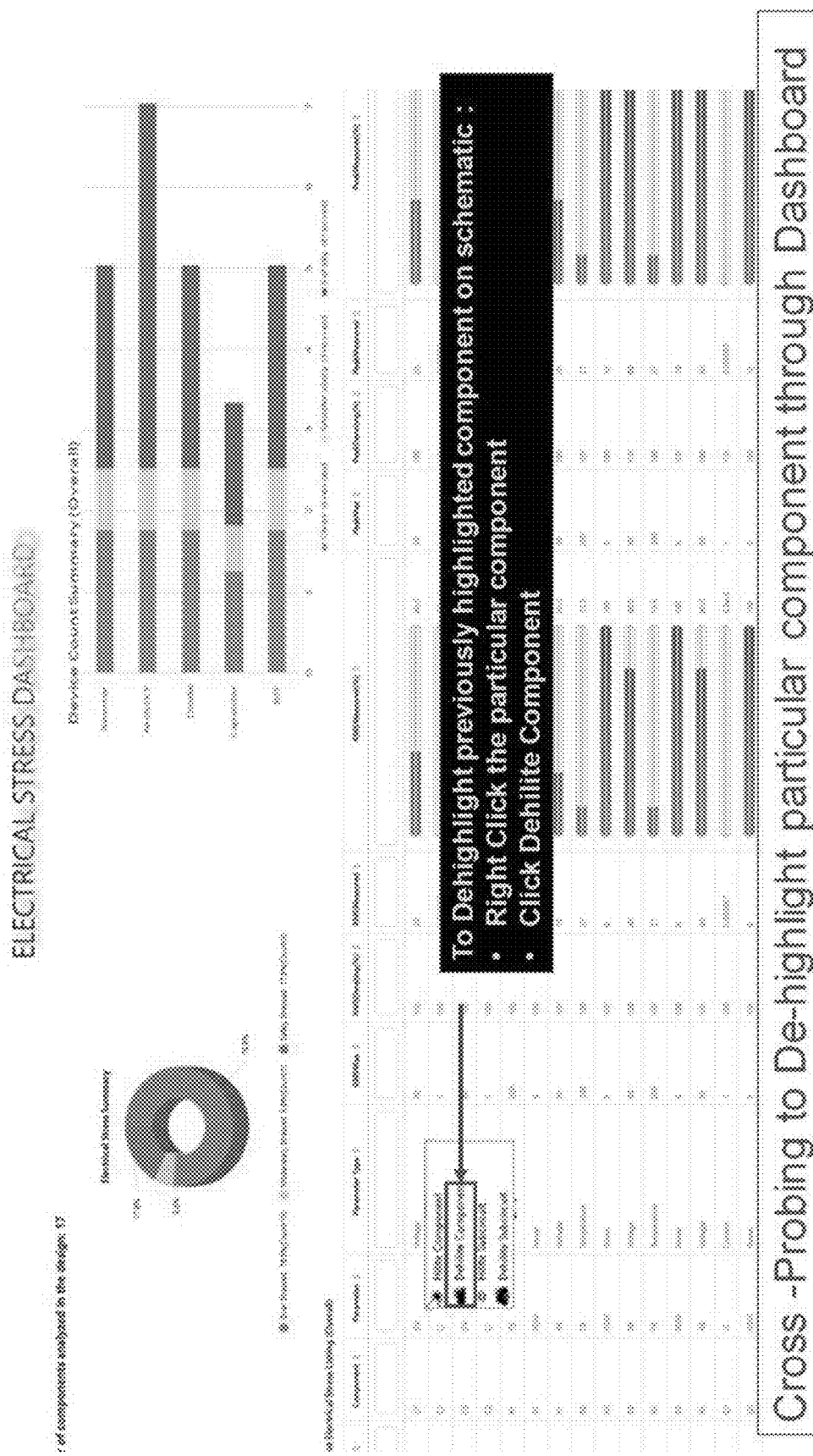
FIG. 23 illustrates an example showing cross-probing consistent with embodiments of overstress identification process.
Figure 24:
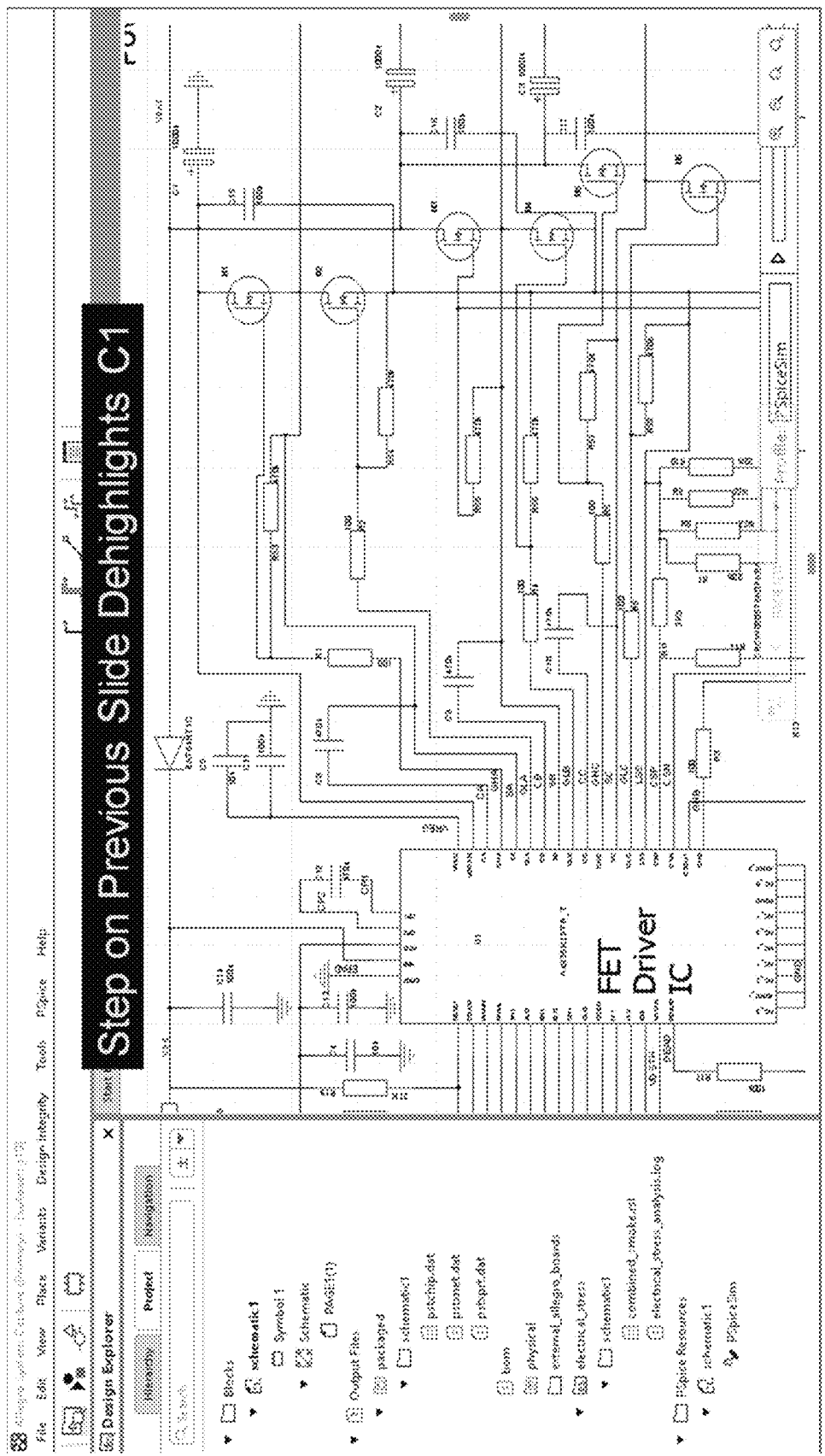
FIG. 24 illustrates an example showing cross-probing consistent with embodiments of overstress identification process.

In some embodiments, and as shown in FIGS. 21-22, the process may include a graphical user interface that may be configured to highlight all the components of a extracted subcircuit that are electrically associated to each other and impact the electrical stress analysis. In operation, the process may allow a user to select (e.g., using a right click, etc.) a component and the subcircuit associated with that component may be highlighted at the graphical user interface. In this way, all of the associated components affecting the stress on that component may be highlighted together automatically. Similarly, the process may allow for the de-emphasizing or de-highlighting a selected component as shown in FIGS. 23-24.

Figure 25:
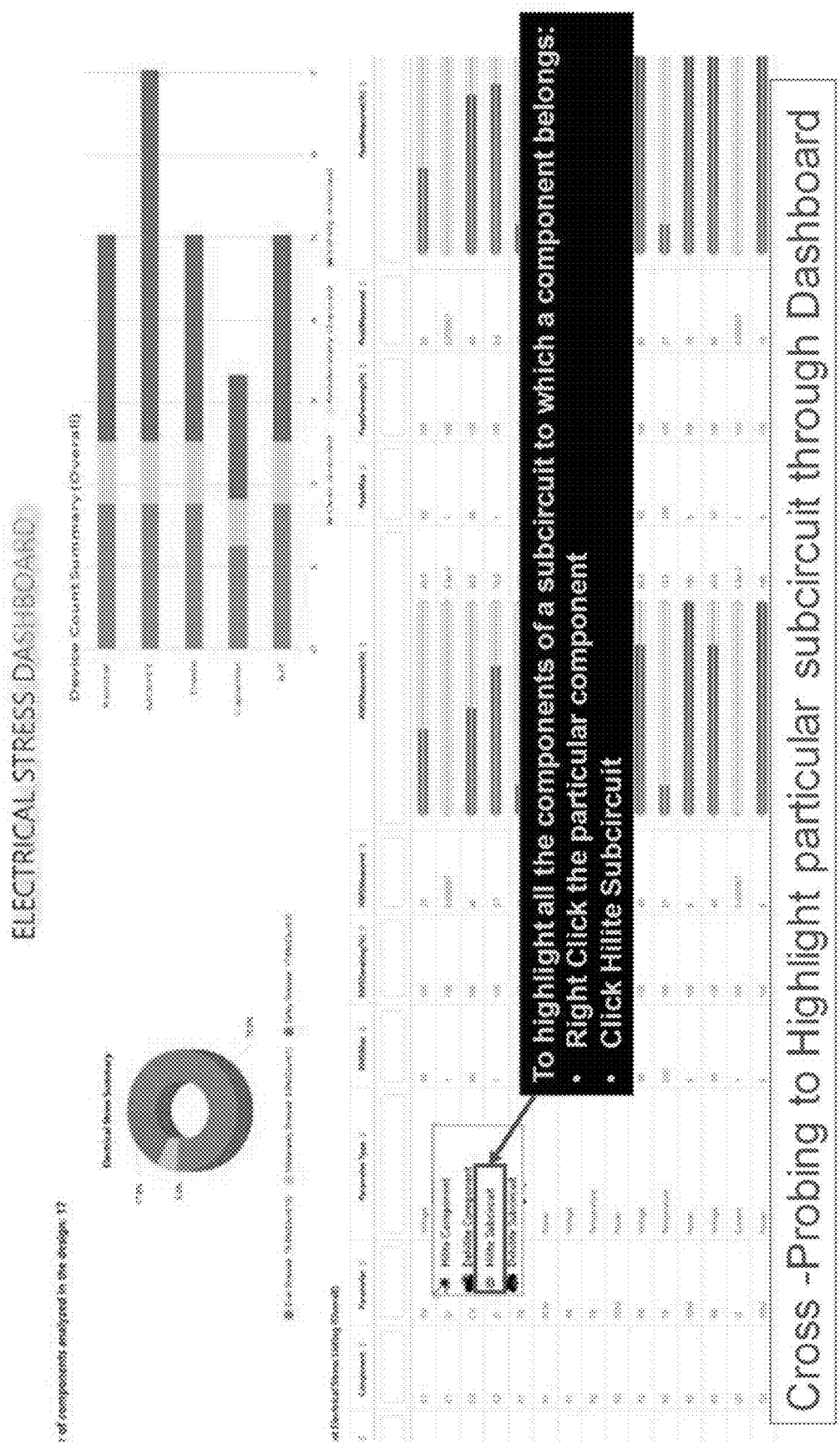
FIG. 25 illustrates an example showing cross-probing consistent with embodiments of overstress identification process.
Figure 26:
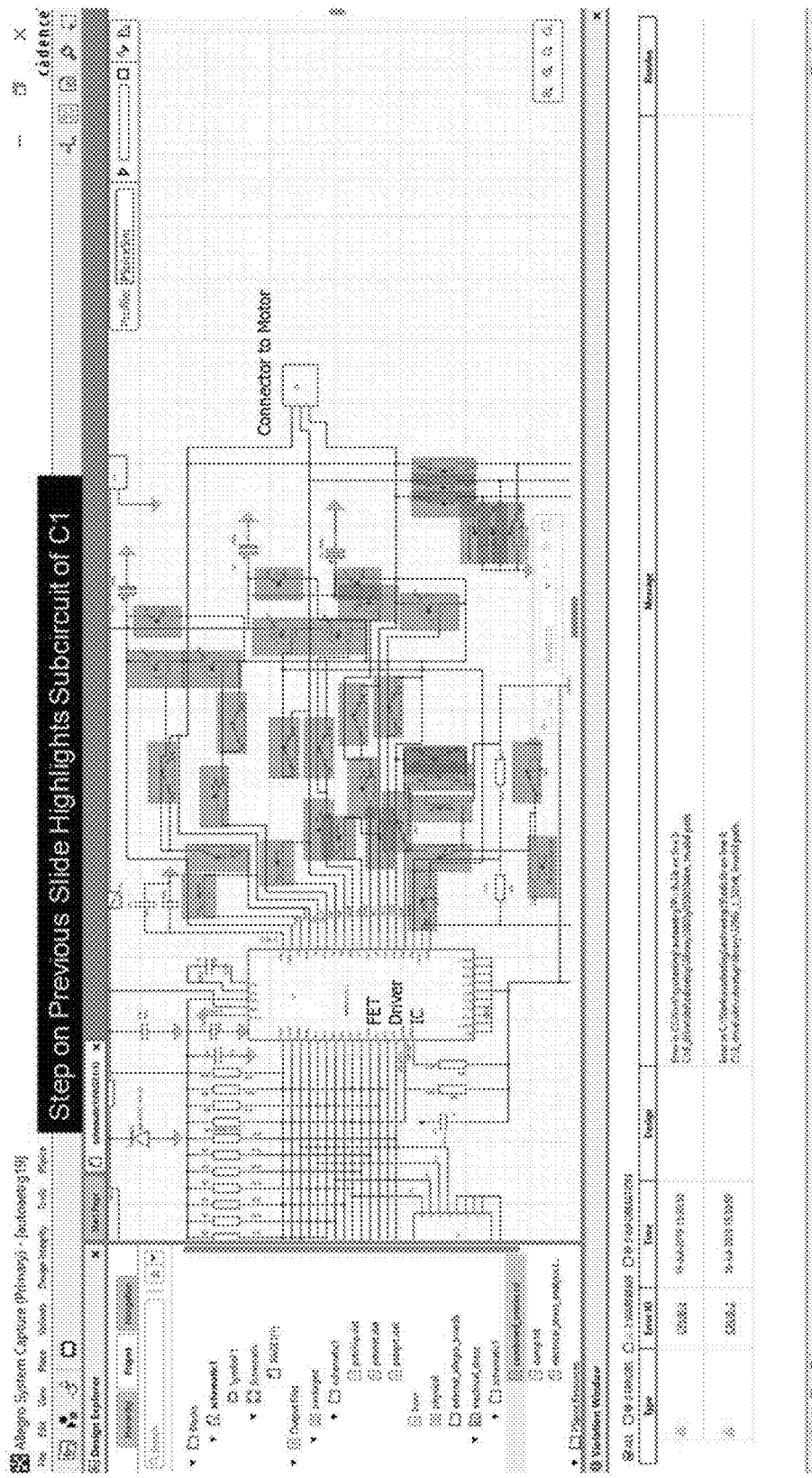
FIG. 26 illustrates an example showing cross-probing consistent with embodiments of overstress identification process.

In some embodiments, and as shown in FIGS. 25-26, the process may allow for highlighting of all of the components of a subcircuit to which a component belongs. An example of the selection is shown in FIG. 25 and the resulting display in FIG. 26.

Figure 27:
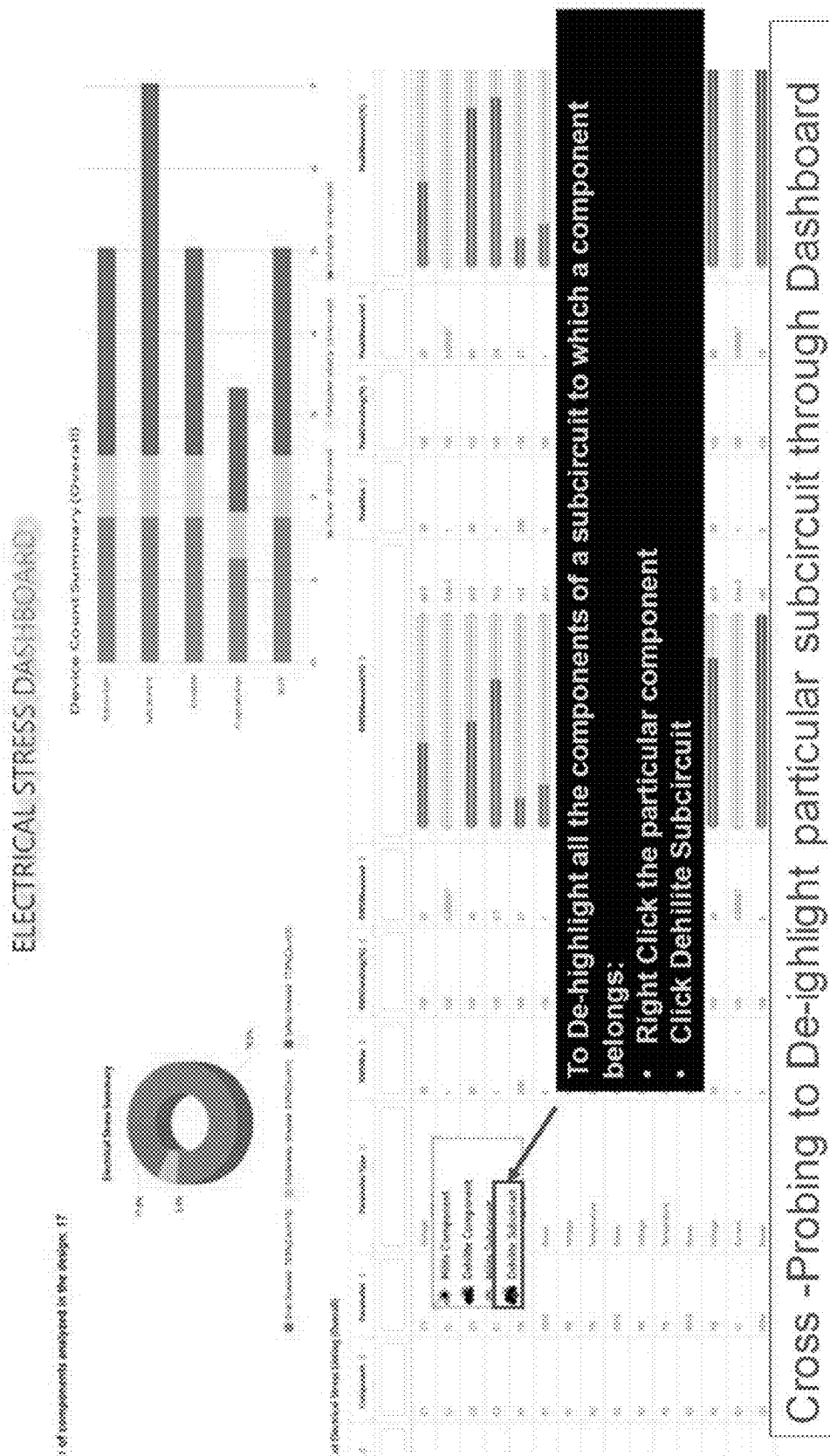
FIG. 27 illustrates an example showing cross-probing consistent with embodiments of overstress identification process.
Figure 28:
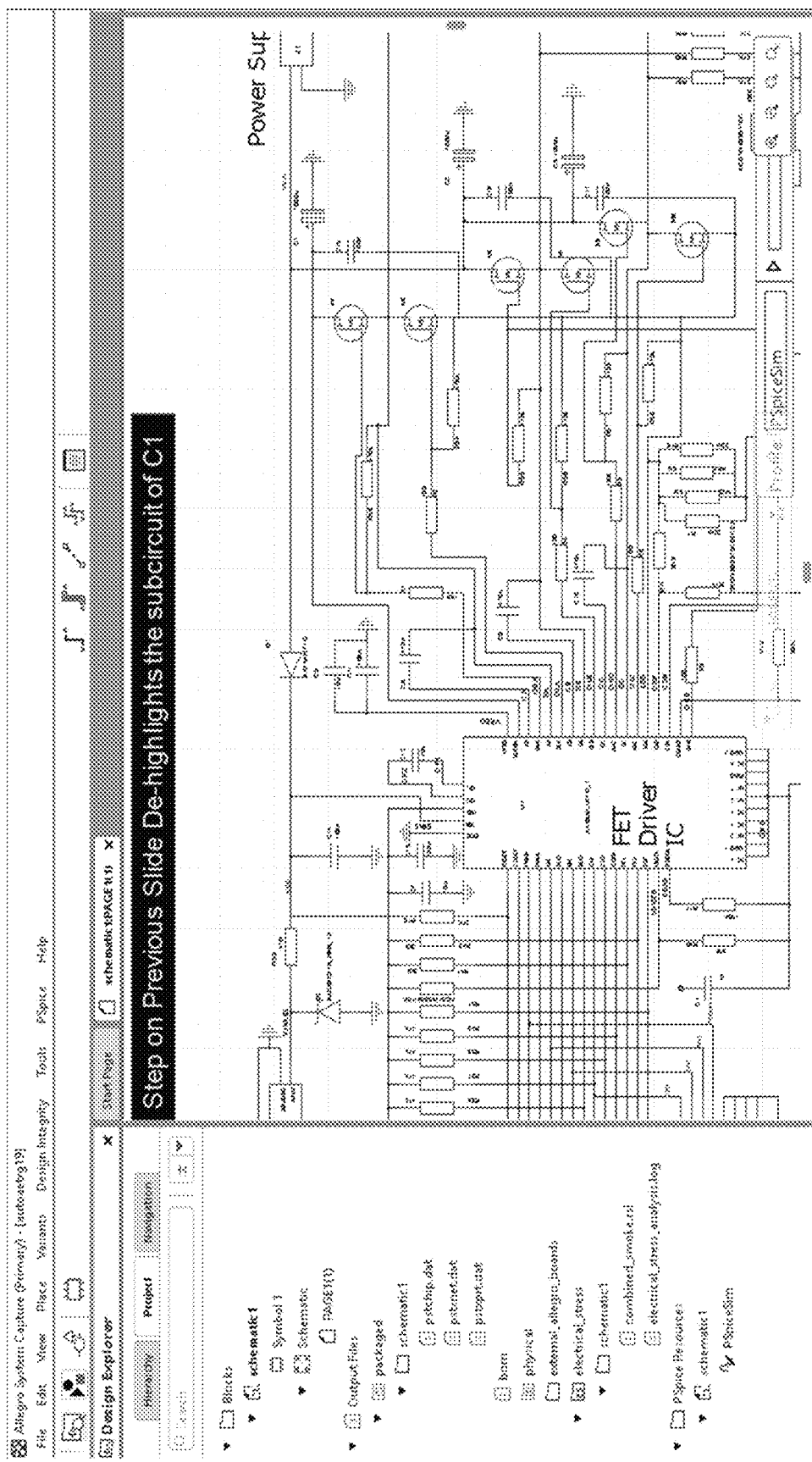
FIG. 28 illustrates an example showing cross-probing consistent with embodiments of overstress identification process.

In some embodiments, and as shown in FIGS. 27-28, the process may allow for de-highlighting of all of the components of a subcircuit to which a component belongs. An example of the selection is shown in FIG. 27 and the resulting display in FIG. 28. Accordingly, the teachings of the present disclosure requires no setup from the user and enables instant debugging.

Figure 29:
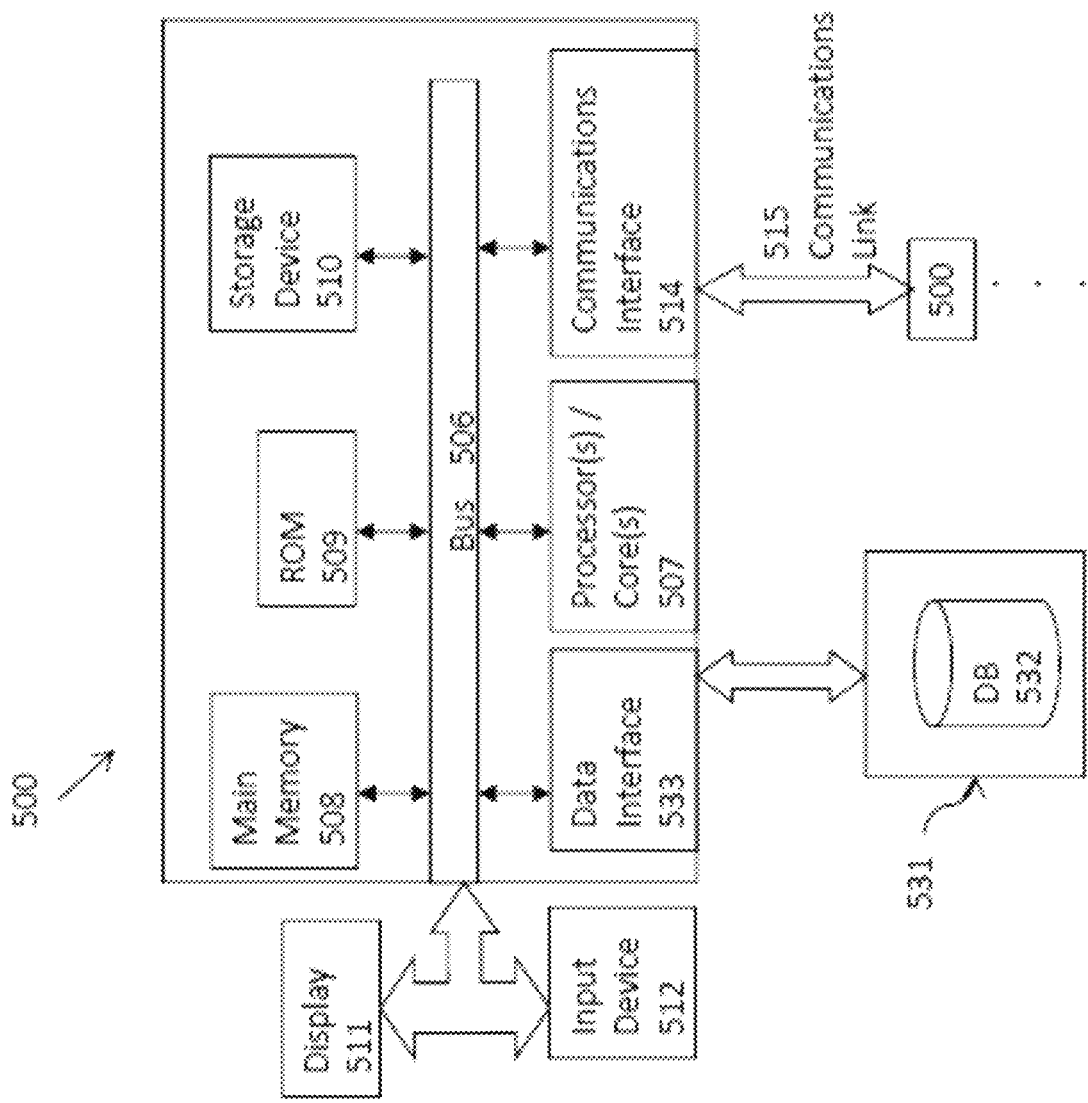
FIG. 29 illustrates a system diagram that may be used to implement one or more embodiments.

FIG. 29 illustrates a block diagram of an illustrative computing system 500 suitable for power-grid aware simulation of an IC-Package schematic as described in the preceding paragraphs with reference to various figures. Computer system 500 includes a bus 506 or other communication mechanism for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown).

According to one embodiment, computing system 500 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A mechanisms described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a mechanism described herein may be implemented as an application-specific integrated circuit (ASIC) in some embodiments.

In these embodiments, a mechanism may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of mechanism. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any non-transitory medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program, e.g., application code, through communication link 515 and communication interface 514. Received program code may be executed by processor 507 as it is received, and/or stored in disk drive 510, or other non-volatile storage for later execution. In an embodiment, the computing system 500 operates in conjunction with a data storage system 531, e.g., a data storage system 531 that includes a database 532 that is readily accessible by the computing system 500. The computing system 500 communicates with the data storage system 531 through a data interface 533. A data interface 533, which is coupled with the bus 506, transmits and receives electrical, electromagnetic or optical signals that include data streams representing various types of signal information, e.g., instructions, messages and data. In embodiments of the invention, the functions of the data interface 533 may be performed by the communication interface 514. It also should be appreciated that the computer system 500 may be extended to a cloud-based computing system.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer-implemented method for use in an electronic design environment comprising:
   receiving, using at least one processor, an electronic design schematic;
   automatically splitting, using the at least one processor, the electronic design schematic into a plurality of subcircuits;
   independently simulating each of the plurality of subcircuits to generate simulation results; and
   analyzing the simulation results to determine over-stress associated with the plurality of subcircuits.

2. The computer-implemented method of claim 1, wherein the electronic design schematic is a printed circuit board ("PCB") schematic.

3. The computer-implemented method of claim 1, wherein splitting includes using a bias net as a terminating interface.

4. The computer-implemented method of claim 1, wherein splitting includes using a digital net as a terminating interface.

5. The computer-implemented method of claim 1, wherein splitting includes using a connector as a terminating interface.

6. The computer-implemented method of claim 1, wherein independently simulating includes using pin information to apply a stimulus.

7. The computer-implemented method claim 1, further comprising:
   displaying at least a portion of an overstressed device at a graphical user interface.

8. A non-transitory computer-readable storage medium having stored thereon instructions that when executed by a machine result in the following operations:

receiving, using at least one processor, an electronic design schematic;

splitting, without user action and using the at least one processor, the electronic design schematic into a plurality of subcircuits;

independently simulating each of the plurality of subcircuits to generate simulation results; and analyzing the simulation results to determine over-stress associated with the plurality of subcircuits.

9. The non-transitory computer-readable storage medium of claim 8, wherein the electronic design schematic is a printed circuit board ("PCB") schematic.

10. The non-transitory computer-readable storage medium of claim 8, wherein splitting includes using a bias net as a terminating interface.

11. The non-transitory computer-readable storage medium of claim 8, wherein splitting includes using a digital net as a terminating interface.

12. The non-transitory computer-readable storage medium of claim 8, wherein splitting includes using a connector as a terminating interface.

13. The non-transitory computer-readable storage medium of claim 8, wherein independently simulating includes using pin information to apply a stimulus.

14. The non-transitory computer-readable storage medium of claim 8, further comprising:

displaying at least a portion of an overstressed device at a graphical user interface.

15. A system for use in an electronic design environment comprising:

a computing device having at least one processor configured to receive an electronic design schematic, the at least one processor further configured to automatically split the electronic design schematic into a plurality of subcircuits, the at least one processor further configured to independently simulate each of the plurality of subcircuits to generate simulation results, the at least one processor further configured to analyze the simulation results to determine over-stress associated with the plurality of subcircuits.

16. The system of claim 15, wherein the electronic design schematic is a printed circuit board ("PCB") schematic.

17. The system of claim 15, wherein splitting includes using a bias net as a terminating interface.

18. The system of claim 15, wherein splitting includes using a digital net as a terminating interface.

19. The system of claim 15, wherein splitting includes using a connector as a terminating interface.

20. The system of claim 15, wherein independently simulating includes using pin information to apply a stimulus.

* * * * *